(12) United States Patent
Esaki et al.

(10) Patent No.: US 6,862,791 B2
(45) Date of Patent: Mar. 8, 2005

US006862791B2

(54) METHOD OF MANUFACTURING FILM CASE

(75) Inventors: Toshiro Esaki, Minamiashigara (JP); Hideki Matsuzawa, Minamiashigara (JP); Masami Seko, Minamiashigara (JP); Nobuo Matsuda, Minamiashigara (JP); Hiroki Omote, Minamiashigara (JP); Kazuo Tanabe, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/654,435

(22) Filed: Sep. 4, 2003

(65) Prior Publication Data

US 2004/0040140 A1 Mar. 4, 2004

Related U.S. Application Data

(62) Division of application No. 09/908,612, filed on Jul. 20, 2001.

(30) Foreign Application Priority Data

Jul. 31, 2000 (JP) ...................................... 2000-232231

(51) Int. Cl.[7] .............................................. B21D 39/03
(52) U.S. Cl. ............................. 29/430; 29/794; 29/806
(58) Field of Search .................. 29/806, 430, 407.01, 29/407.04, 720, 773, 564.6, 793, 794; 396/527, 32

(56) References Cited

U.S. PATENT DOCUMENTS

| | | | |
|---|---|---|---|
| 3,607,283 A | 9/1971 | Gold | |
| 3,733,679 A | * 5/1973 | Bruneau | ...................... 29/431 |
| 4,236,798 A | 12/1980 | Sylvester | |
| 4,527,320 A | * 7/1985 | Deconinck | ................... 29/33 R |
| 4,804,988 A | 2/1989 | Hashimoto et al. | |
| 4,878,659 A | 11/1989 | Besemann | |
| 5,114,230 A | 5/1992 | Pryor | |
| 5,649,411 A | 7/1997 | Dirx | |
| 6,061,898 A | 5/2000 | Suzuki et al. | |
| 6,192,197 B1 | 2/2001 | Ono | |
| 6,195,508 B1 | * 2/2001 | Katayama et al. | ............. 396/32 |
| 6,533,475 B2 | * 3/2003 | Katayama | ................... 396/517 |
| 2001/0031140 A1 | * 10/2001 | Takatori et al. | ............... 396/32 |
| 2001/0049069 A1 | 12/2001 | Shimizu et al. | |

FOREIGN PATENT DOCUMENTS

| | | |
|---|---|---|
| GB | 1 275 573 | 5/1972 |
| GB | 2 255 964 A | 11/1992 |
| JP | 2-304539 A | 12/1990 |
| JP | 8-201984 A | 8/1996 |
| JP | 10-58384 A | 3/1998 |
| JP | 2000-89351 A | 3/2000 |

* cited by examiner

*Primary Examiner*—David P. Bryant
(74) *Attorney, Agent, or Firm*—Sughrue Mion, PLLC

(57) ABSTRACT

A casing and a lid which are supplied to a casing/lid supply machine are fed to a main assembly line where a light-shielding sheet is mounted on the casing and a film cover supplied from a film cover assembly line is mounted in the casing. Pressers supplied from a presser assembly line are mounted on the lid. The casing and the lid are combined with each other, completing a film case. The film case manufacturing system is capable of efficiently manufacturing highly accurate film cases and is relatively compact in structure.

1 Claim, 20 Drawing Sheets

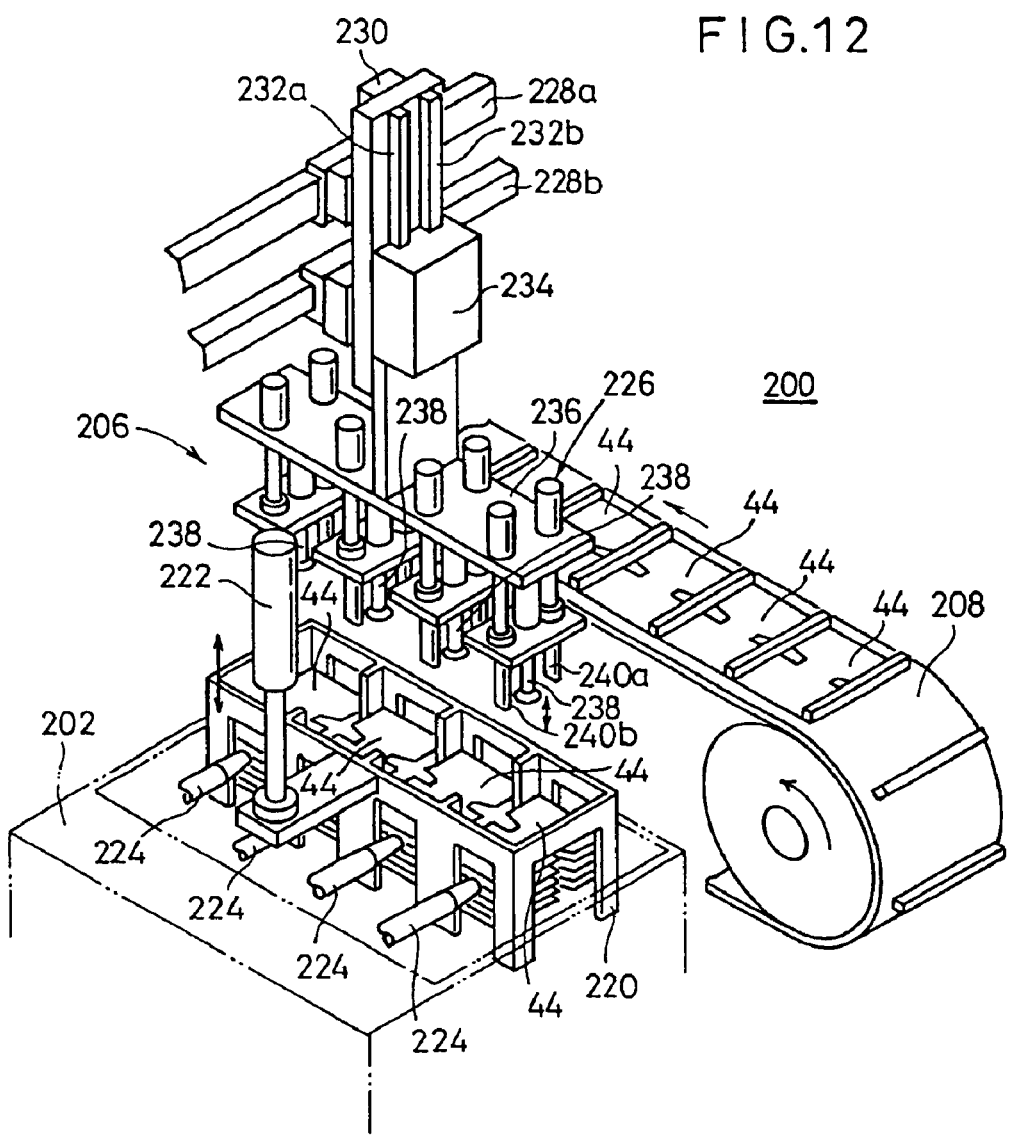
F I G. 12

METHOD OF MANUFACTURING FILM CASE

This is a divisional of application Ser. No. 09/908,612 filed Jul. 20, 2001 now U.S. Pat. No. 6,662,478; the disclosure of which is incorporated herein by reference.

BACKGROUND OF THE INVENTION

1. Field of the Invention

The present invention relates to a system for and a method of manufacturing a film case which comprises a casing having a film discharge slot and a film cover mounted in an exposure opening, and a lid for closing the casing, the lid having a presser for pressing a film.

2. Description of the Related Art

There have been available for sale various instant photographic film packs each comprising a plurality of instant photographic films of the mono-sheet type that are housed in a box-shaped plastic film case. The instant photographic film packs are used in instant photographic cameras, printers, etc.

As disclosed in Japanese laid-open patent publication No. 2000-89351, for example, the film case of an instant photographic film pack comprises a casing and lid for closing the casing. The casing and the lid are made of light-shielding plastic. The casing has an exposure opening for exposing the exposure surface of an instant photographic film and a discharge slot for discharging an exposed instant photographic film from the film case. The lid has pressers for pressing the instant photographic films toward the exposure opening.

When not in use, the instant photographic films stored in the film case are held in a light-shielded state by a film cover mounted in the exposure opening and a light-shielding sheet mounted in the discharge slot. When in use, the film cover is removed from the film case through the discharge slot, and thereafter the instant photographic film is exposed and then discharged out of the film case through the discharge slot. The instant photographic films are normally pressed toward the exposure opening by the pressers.

In order to keep the stored instant photographic films shielded from light, the film case is composed of a number of components. It is a time-consuming task to manually assemble those components into the film case. The instant photographic films stored in the film case have to be manufactured highly accurately because they need to be completely shielded from light and to be reliably discharged from the film case.

SUMMARY OF THE INVENTION

It is a general object of the present invention to provide a system for and a method of manufacturing a highly accurate film case efficiently.

A main object of the present invention is to provide a system for and a method of manufacturing a compact film case.

Another object of the present invention is to provide a system for and a method of manufacturing a film case which is capable of shielding stored films from light.

Still another object of the present invention is to provide a system for and a method of manufacturing a highly accurate film case which is capable of reliably discharging stored films without fail.

The above and other objects, features, and advantages of the present invention will becomes more apparent from the following description when taken in conjunction with the accompanying drawings in which a preferred embodiment of the present invention is shown by way of illustrative example.

BRIEF DESCRIPTION OF THE DRAWINGS

FIG. 12 is a perspective view of a transfer machine of a presser supply machine of the film case manufacturing system according to the present invention;

DESCRIPTION OF THE PREFERRED EMBODIMENT

Figure 1:
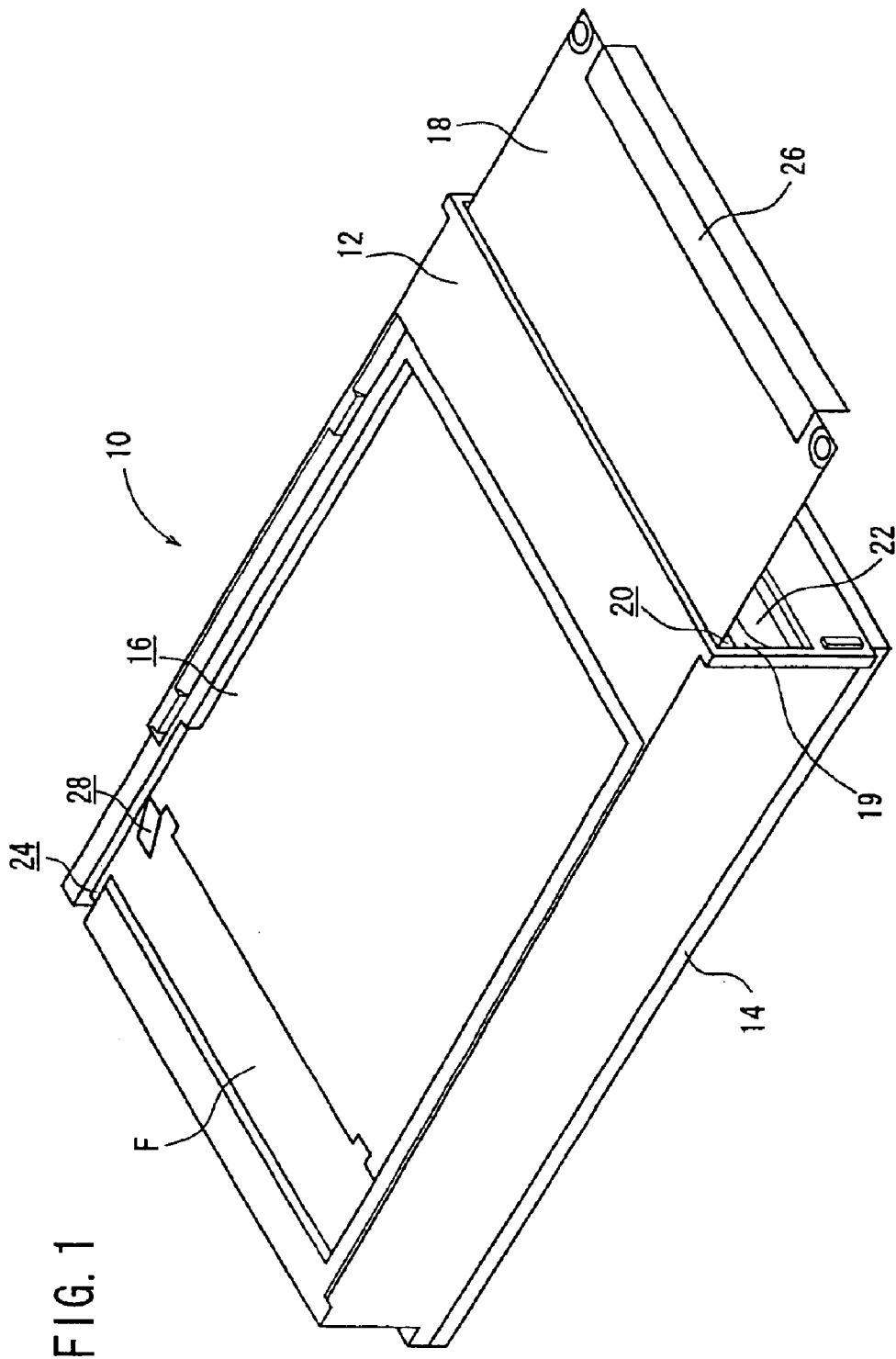
FIG. 1 is a perspective view of a film case manufacturing by a film case manufacturing system according to the present invention.
Figure 2:
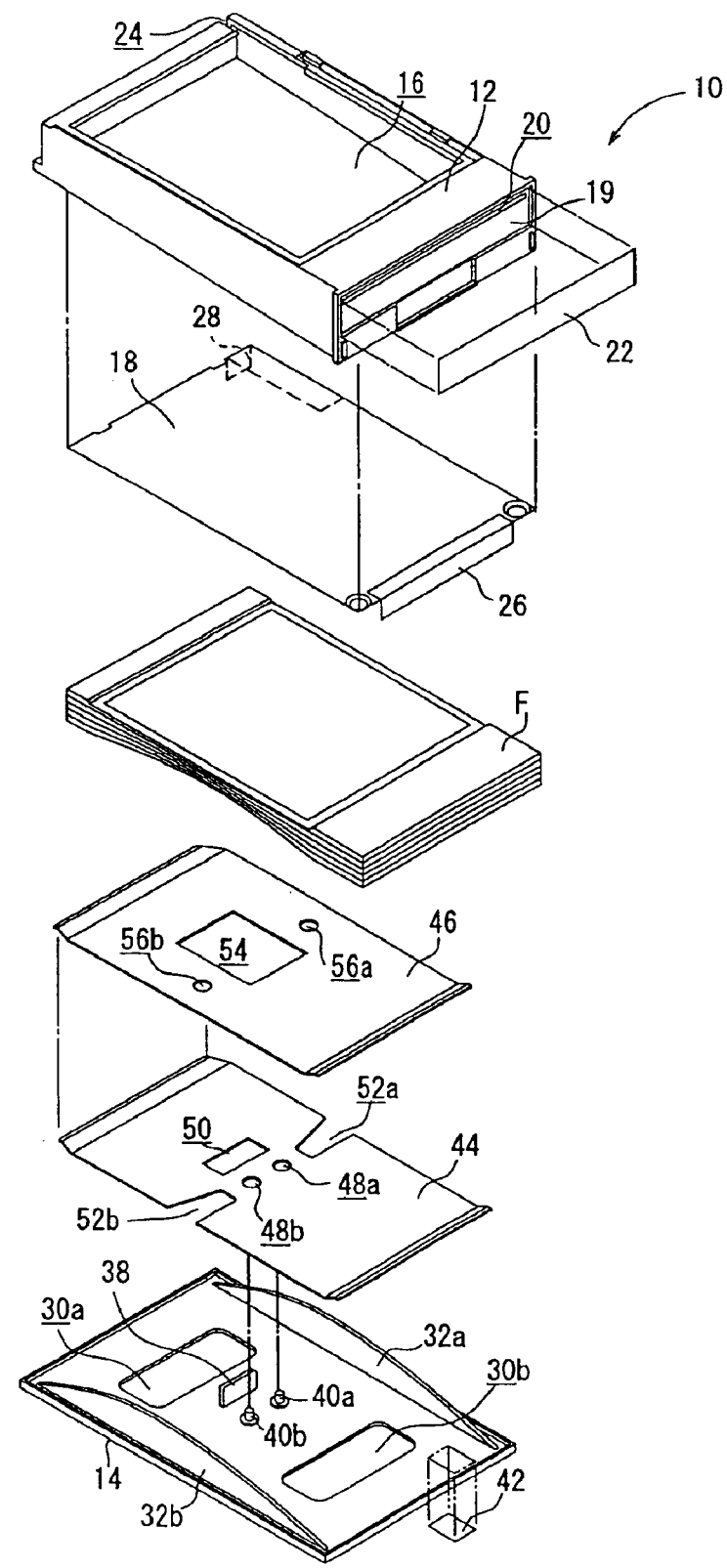
FIG. 2 is an exploded perspective view of the film case, shown in FIG. 1, which stores sheet-like films.

FIG. 1 shows in perspective a film case 10 manufacturing by a film case manufacturing system according to the present invention, and FIG. 2 shows in exploded perspective the film case 10 which stores sheet-like films F. Each of the sheet-like films F is made of a self-developed photosensitive material.

The film case 10 is basically constructed of a rectangular casing 12 for storing a plurality of sheet-like films F and a lid 14 for closing the casing 12.

The casing 12 has an exposure opening 16 in which a film cover 18 for holding the sheet-like films F shielded from light in the casing 12 is removably mounted. The casing 12 also has a film discharge slot 20 defined in an end face 19 of one end thereof for discharging the film cover 18 and exposed sheet-like films F therethrough out of the casing 12. A light-shielding sheet 22 is applied to the side panel 19 such that it can be released to open the film discharge slot 20. The casing 12 also has a groove 24 defined in a corner of the end thereof which is opposite to the side panel 19. A finger (not shown) in a camera that is loaded with the film case 10 is inserted into the groove 24 for discharging the film cover 18 and exposed sheet-like films F through the film discharge slot 20 out of the casing 12.

To the film cover 18 mounted in the exposure opening 16, there are applied a light-shielding sheet 26 bent to a substantially L shape at one end of the film cover 18 and a light-shielding sheet 28 bent to a substantially L shape at the opposite end of the film cover 18. The light-shielding sheet 26 is positioned within the casing 12 directly behind the film discharge slot 20, and cooperates with the light-shielding sheet 22 in holding the sheet-like films F in a light-shielding state. The light-shielding sheet 28 is placed in the groove 24 to prevent extraneous light from entenng the casing 12 through the groove 24.

The lid 14 has a pair of substantially rectangular openings 30a, 30b defined therein at a spaced interval and a pair of ledges 32a, 32b disposed along respective opposite edges thereof on opposite sides of the openings 30a, 30b, the ledges 32a, 32b engaging the casing 12. The lid 14 also has a projecting support tooth 38 positioned between the openings 30a, 30b for preventing the sheet-like films F stored in the casing 12 from tending to bend toward the lid 14. The lid 14 has two crimping pins 40a, 40b disposed centrally thereon adjacent to the support tooth 38. A colored foil 42 is applied to an outer surface of the lid 14 for indicating, to the user, the direction in which the film case 10 is loaded into a camera or the like.

Two pressers 44, 46 are mounted on the lid 14 between the ledges 32a, 32b. The presser 44 which is positioned closely to the lid 14 has two round holes 48a, 48b defined centrally therein with the crimping pins 40a, 40b inserted therein, and an oblong hole 50 defined centrally therein with the support tooth 38 inserted therein. The crimping pins 40a, 40b inserted in the respective round holes 48a, 48b have their tip ends crimped to fix the presser 44 to the lid 14. The presser 44 has V-shaped grooves 52a, 52b defined in respective opposite sides thereof laterally of the crimping pins 40a, 40b. The V-shaped grooves 52a, 52b allow the presser 44 to be easily bent at its center.

The presser 46 which is positioned closely to the sheet-like films F has an opening 54 defined centrally therein with the support tooth 38 and the crimping pins 40a, 40b inserted therein. The presser 46 also has two round holes 56a, 56b defined therein on opposite sides of the opening 54 in alignment with the V-shaped grooves 52a, 52b, respectively. The presser 46 is joined to the presser 44 at one end of the presser 46 which is applied to the presser 44. The presser 44 is thinner than the presser 46. When the film case 10 is loaded into a camera or the like, the presser 44 is bent by pins in the camera or the like that are inserted through the openings 30a, 30b in the lid 14, displacing the presser 46 toward the sheet-like films F.

The film case 10 with the sheet-like films F stored in a light-shielded state is loaded into a camera or the like. Then, a finger inserted through the groove 24 discharges the film cover 18 from the film discharge slot 20. Thereafter, a sheet-like film F in the film case 10 is exposed through the exposure opening 16 to record an image therein, and then discharged from the film discharge slot 20. During this time, the sheet-like films F stored in the film case 10 are normally pressed toward the exposure opening 16 by the pins that are inserted through the openings 30a, 30b in the lid 14.

Figure 3:
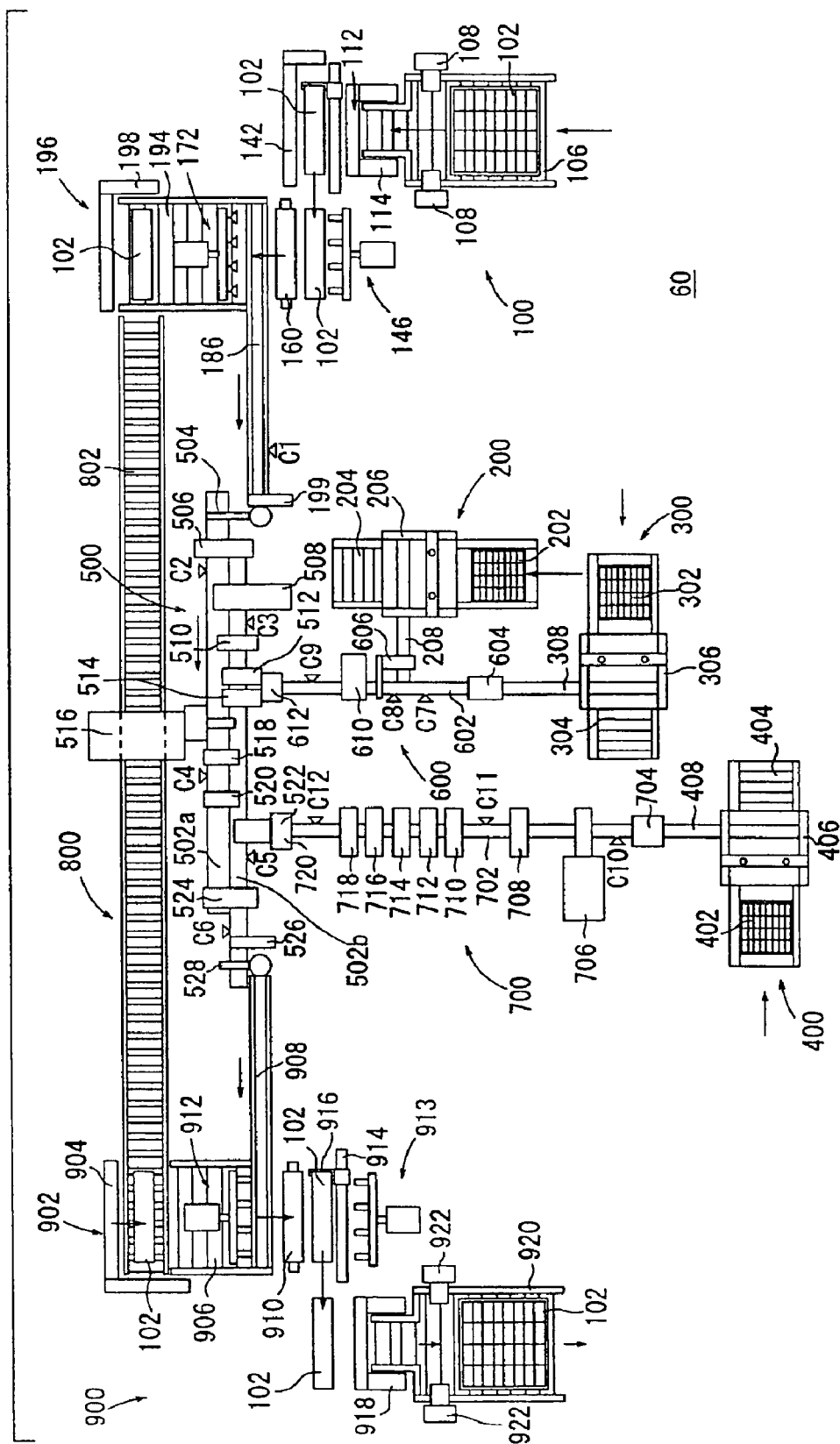
FIG. 3 is a plan view of the film case manufacturing system according to the present invention.

FIG. 3 shows in plan a film case manufacturing system 60 for manufacturing the film 10 constructed as described above.

The film case manufacturing system 60 basically comprises a casing/lid supply machine 100 for supplying casings 12 and lids 14, presser supply machines 200, 300 for supplying pressers 44, 46, a film cover supply machine 400 for supplying film covers 18, a main assembly line 500 for assembling a film cover 18 on a casing 12 and also assembling pressers 44, 46 on a lid 14, a presser assembly line 600 for assembling pressers 44, 46 and supplying the assembled pressers 44, 46 to the main supply line 500, a film cover assembly line 700 for assembling a film cover 18 and supplying the assembled film cover 18 to the main assembly line 500, a container feed line 800 for feeding a container 102 supplied from the casing/lid supply machine 100, and a film case stacking machine 900 for stacking casings 12 with film covers 18 assembled thereon and lids 14 with pressers 44, 46 assembled thereon, in a container 102.

The main assembly line 500 extends linearly, and the presser assembly line 600 and the film cover assembly line 700 are connected perpendicularly to the main assembly line 500. The container feed line 800 extends linearly and is arranged substantially parallel to the main assembly line 500.

Figure 4:
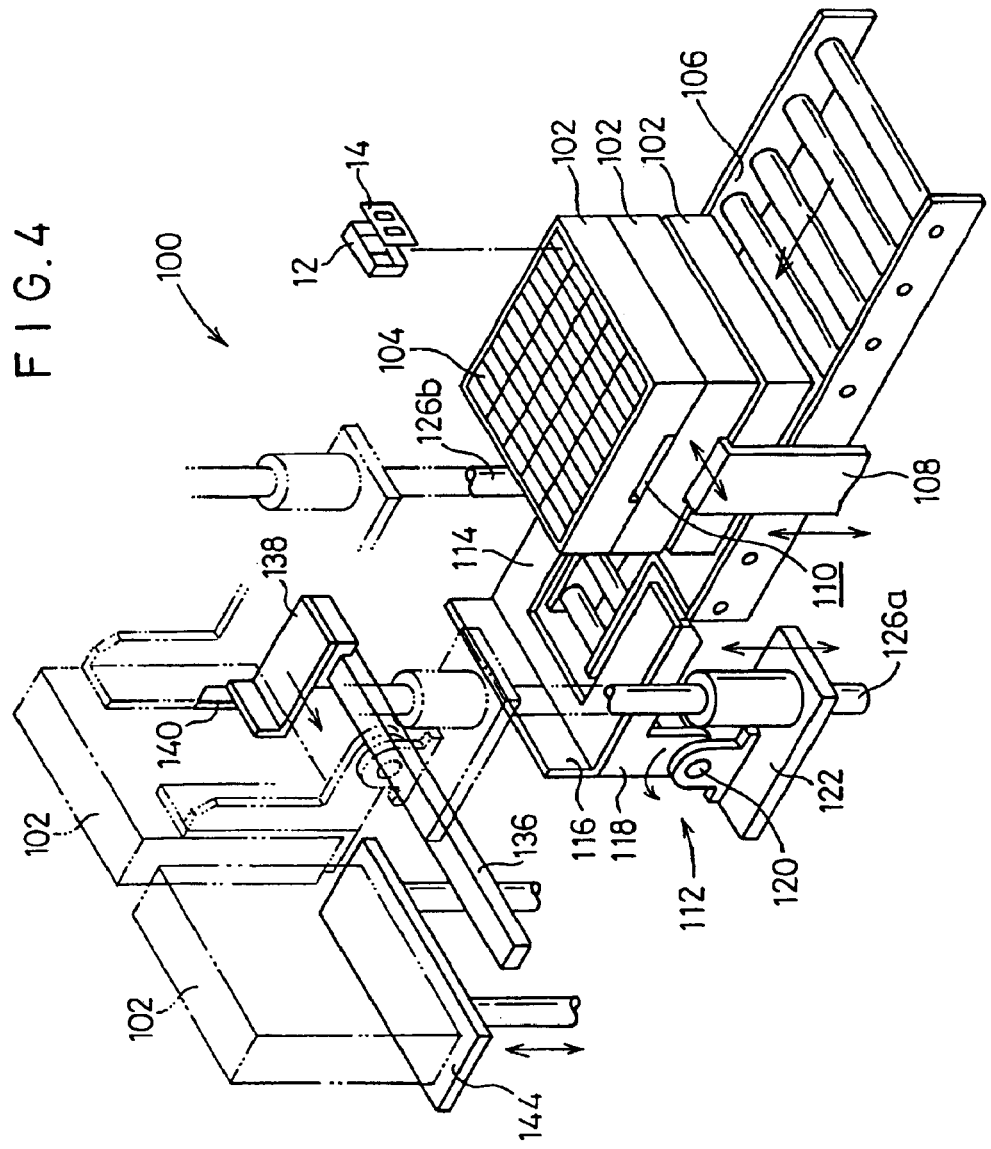
FIG. 4 is a perspective view of a casing/lid supply machine of the film case manufacturing system.

In the casing/lid supply machine 100, as shown in FIG. 4, casings 12 and lids 14 are stored in combined pairs horizontally in bins or compartments 104 defined in containers 102, and supplied in the containers 102. The casing/lid supply machine 100 has a roller conveyor 106 for feeding the containers 102 and a pair of lift mechanisms 108 for lifting and lowering the containers 102. The lift mechanisms 108 are disposed on opposite sides of the roller conveyor 106 at a substantially intermediate section thereof in the direction in which the roller conveyor 106 feeds the conveyors 106. The lift mechanisms 108 have vertically movable L-shaped arms that are movable horizontally toward and away from the roller conveyor 106. The arms engage in grooves 110 defined in the containers 102 and lift and lower the stacked containers 102 when the arms are vertically moved.

Figure 5:
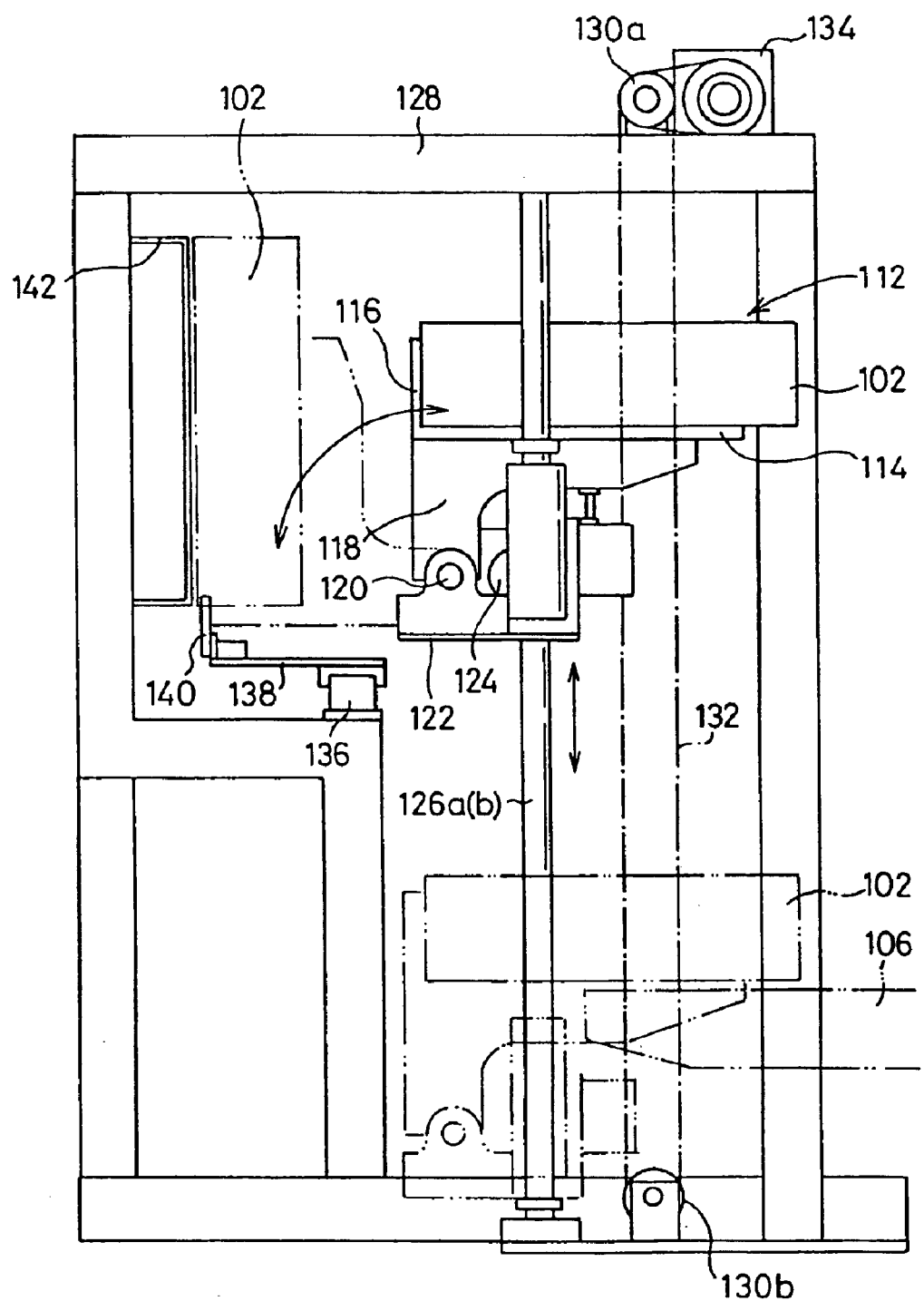
FIG. 5 is a side elevational view of a lifting/lowering mechanism of the casing/lid supply machine.

A lifting and lowering mechanism 112 for lifting and lowering the containers 102 is disposed downstream of the roller conveyor 106. The lifting and lowering mechanism 112 has a table 114 for placing the bottom of a container 102 thereon, the table 114 having a recess which receives a portion of the roller conveyor 106 therein, and a support plate 116 extending perpendicularly to the table 114 for supporting a side panel of a container 102. The table 114 has downwardly extending legs 118 rotatably supported on a support base 122 by a rotatable shaft 120. As shown in FIG. 5, the support base 122 supports a motor 124 thereon whose rotational power is transmitted via a chain to the rotatable shaft 120 to rotate the table 114.

The support base 122 is vertically movably supported by vertical guide bars 126a, 126b. The guide bars 126a, 126b have upper and lower ends fixed to a frame 128 which includes upper and lower beams with sprockets 130a, 130b mounted thereon. A chain 132 is trained around the sprockets 130a, 130b. The support base 122 is coupled to the chain 132. When the chain 132 is driven by a motor 134 disposed on the upper beam of the frame 128, the table 114 is vertically moved.

A guide rail 136 is disposed above and on one side of the lifting and lowering mechanism 112 as it is lowered, and extends in a direction perpendicular to the direction in which the containers 102 are fed by the roller conveyor 106. A displacement plate 138 is movable on and along the guide rail 136. The movable plate 138 has a dog 140 on an upper end thereof for engagement with a container 102. The displacement plate 138 displaces the container 102 which has been erected upon angular movement by 90° of the table 114 along the guide rail 136. An ejection prevention wall 142 is disposed in the vicinity of the container 102 which has been erected for preventing casings 12 and lids 14 from being ejected from the container 102.

Figure 6:
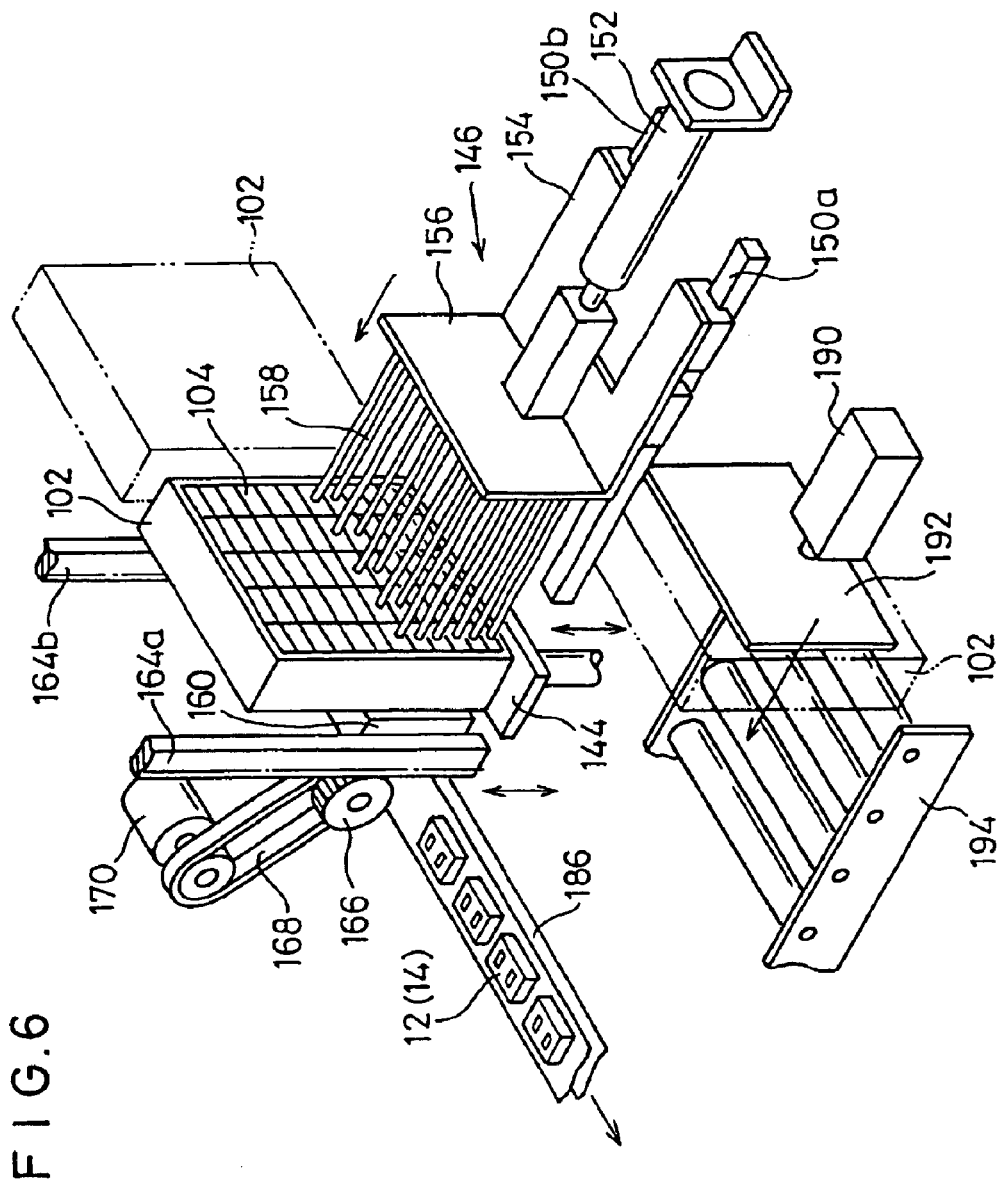
FIG. 6 is perspective view of a pushing mechanism and nearby parts of the casing/lid supply machine.

The container 102 is moved by the displacement plate 138 onto a lifting and lowering table 144. As shown in FIG. 6, a pushing mechanism 146 for pushing casings 12 and lids 14 from the container 102 is disposed in confronting relation to the container 102 that is placed on the lifting and lowering table 144.

Figure 7:
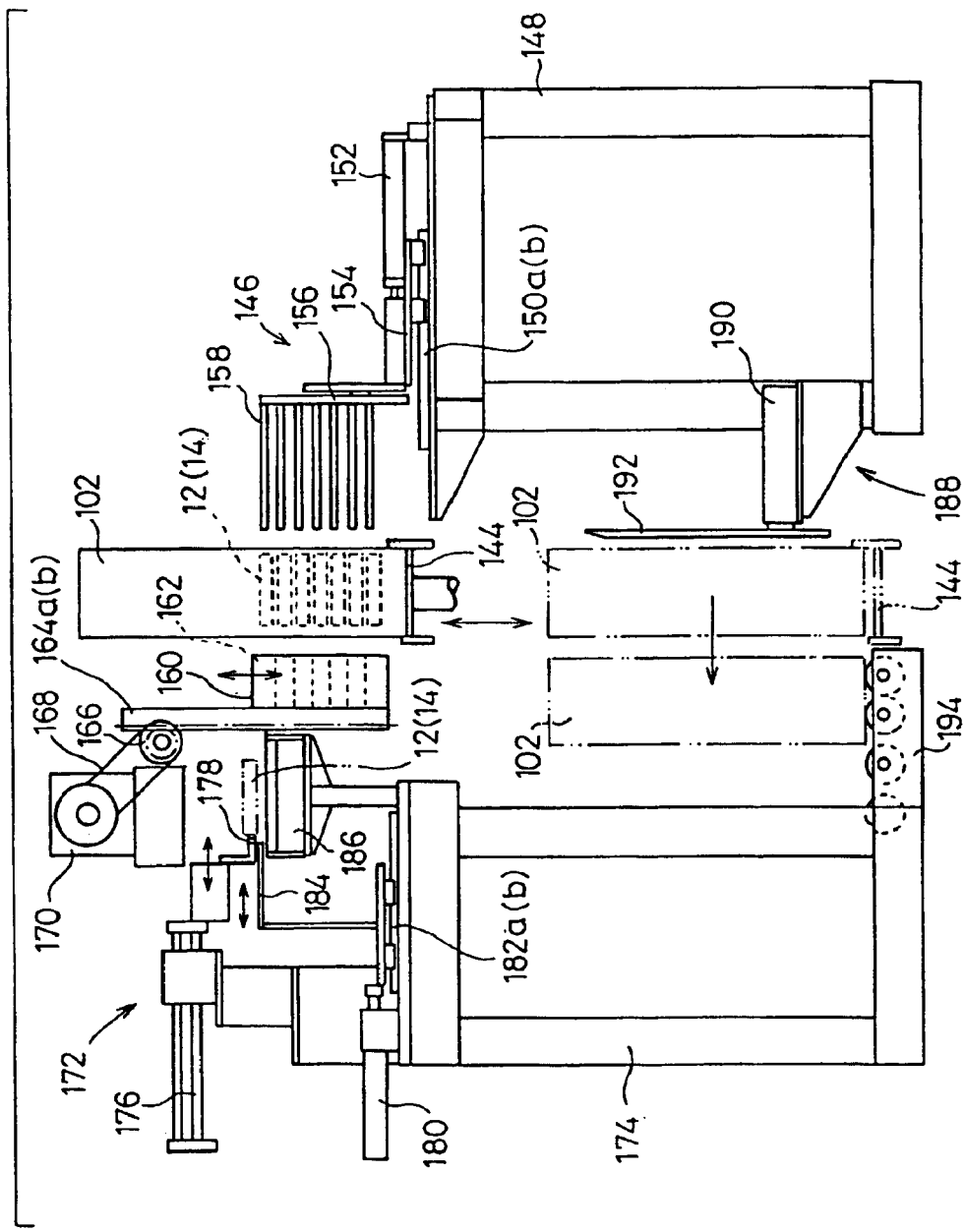
FIG. 7 is a side elevational view of the pushing mechanism and nearby parts of the casing/lid supply machine.

As shown in FIG. 7, the pushing mechanism 146 has a movable table 154 that is movable by a cylinder 152 along guide rails 150a, 150b fixedly mounted on an upper surface of a frame 148. The movable table 154 supports thereon a vertical support plate 156 having a plurality of horizontal pusher pins 158 mounted thereon for alignment with bins 104 of a container 102 on the lifting and lowering table 144.

The container 102 on the lifting and lowering table 144 is juxtaposed by a buffer magazine 160 for temporarily holding casings 12 and lids 14. The buffer magazine 160 has bins or compartments 162 which are half as many as the bins 104 of a container 102. The buffer magazine 160 has its opposite sides held by vertical racks 164a, 164b that are held in mesh with a pinion 166 operatively coupled to a motor 170 by a belt 168. When the pinion 166 is rotated by the motor 170 through the belt 168, the racks 164a, 164b are moved vertically, thus vertically moving the buffer magazine 160.

A removing mechanism 172 for attracting and removing casings 12 and lids 14 is disposed across the buffer magazine 160 from the container 102 on the lifting and lowering table 144. The removing mechanism 172, which is mounted on an upper surface of a frame 174, comprises suction cups 178 movable by a cylinder 176 for attracting sides of casings 12 held by the buffer magazine 160 and removing the casings 12 from the buffer magazine 160, and a support plate 184 movable toward the buffer magazine 160 along guide rails 182a, 182b on the frame 174 by a cylinder 180, for supporting the casings 12 and the lids 14 that have been removed by the suction cups 178.

A linear feed line 186 which comprises a belt conveyor is disposed directly below the support plate 184 for feeding the casing 12 and the lid 14 that have been removed from the buffer magazine 160 by the suction cup 178 to the main assembly line 50. The feed line 186 has a terminal end coupled to the main assembly line 500 and associated with a defective product removal device 199 for discharging a casing 12 and a lid 14 out of the feed line 186 if the casing 12 or the lid 14 is defective, e.g., if the lid 14 is positionally displaced from the casing 12 or oriented in an opposite direction with respect to the casing 12.

A pushing mechanism 188 for pushing an empty container 102 from which all casings 12 and lids 14 have been removed is disposed below the pushing mechanism 146. The pushing mechanism 188 has a vertical pusher plate 192 that is movable by a cylinder 190. The pusher plate 192 serves to move an empty container 102 lowered by the lifting and lowering table 144 toward a roller conveyor 194 that extends perpendicularly to the feed line 186.

As shown in FIG. 3, the roller conveyor 194 extends below the removing mechanism 172 and is coupled to an upstream section of the container feed line 800 where a transfer mechanism 196 is disposed. The transfer mechanism 196 has a movable arm 198 movable toward the container feed line 800 for transferring an empty container 102 fed downstream on the roller conveyor 194 onto a roller conveyor 802 of the container feed line 800.

The film case stacking machine 900 is of a structure which is substantially identical to the structure of the casing/lid supply machine 100, and will be described briefly below.

The film case stacking machine 900 has a transfer mechanism 902 disposed on a downstream section of the container feed line 800. The transfer mechanism 902 has a movable arm 904 for transferring an empty container 102 onto a roller conveyor 906. The roller conveyor 906 extends perpendicularly to the container feed line 800. A feed line 908 which comprises a belt conveyor for feeding a film case 10 that has been assembled on the main assembly line 500 is disposed over an intermediate section of the roller conveyor 906.

On both sides of the feed line 908 over the roller conveyor 906, there are disposed a buffer magazine 910 for temporarily holding film cases 10 and a pushing mechanism 912 for pushing film cases 10 toward a buffer magazine 910. Near the buffer magazine 910, there are disposed a removing mechanism 913 for attracting and removing film cases 10 stored in the buffer magazine 910 and placing the film cases 10 into a container 102, and a displacement plate 916 for moving the container 102 with the film cases 10 stored therein in a direction perpendicular to the direction in which the film cases 10 have been removed from the buffer magazine 910. In a direction in which the container 102 is moved, there is disposed a lifting and lowering mechanism 918 for turning the container 102, which has been moved by the displacement plate 916, from an erected position to a lying position, and also lifting and lowering the container 102. A roller conveyor 920 is joined to a downstream end of the lifting and lowering mechanism 918. A pair of lift mechanisms 922 for lifting and lowering the container 102 is disposed one on each side of the roller conveyor 920.

The main assembly line 500 will be described below. The main assembly line 500 has two parallel assembly lines, i.e., a first assembly line 502a and a second assembly line 502b. The first assembly line 502a is positioned closer to the container feed line 800. Each of the first assembly line 502a and the second assembly line 502b comprises a single elongate plate movable reciprocally in its longitudinal direction and also movable vertically to feed casings 12 and lids 14 intermittently by a predetermined pitch.

A transfer device 504 for transferring casings 12 and lids 14 from the feed line 186 onto the first assembly line 502a is disposed between a terminal end of the feed line 186 and a starting end of the first assembly line 502a. A transfer device 506 (separating mechanism) for transferring only lids 14 fed by the first assembly line 502a onto the second assembly line 502b is disposed between the first assembly line 502a and a starting end of the second assembly line 502b.

Downstream of the transfer device 506 on the second assembly line 502b, there are successively disposed a foil applying mechanism 508 (foil mounting mechanism) for applying a foil 42 to a lid 14, a lid inverting device 510 for inverting a lid 14 so that its reverse side faces upwardly, a presser mounting device 512 (presser mounting mechanism) for mounting pressers 44, 46 supplied from the presser assembly line 600 on a lid 14, and a presser fixing device 514 for fixing pressers 44, 46 to a lid 14.

On the first assembly line 502a positioned downstream of the presser fixing device 514, there are successively disposed a light-shielding sheet temporarily applying device 516 (third light-shielding sheet mounting mechanism) for temporarily applying a light-shielding sheet 22 (third light-shielding sheet) to a side of a casing 12, a light-shielding sheet finally applying device 518 for finally applying a light-shielding sheet 22, and an exchanging device 520 for exchanging a casing 12 on the first assembly line 502a and a lid 14 on the second assembly line 502b with each other.

Downstream of the exchanging device 520, there are successively disposed a film cover inserting device 522 (film cover mounting mechanism) for inserting a film cover 18 supplied from the film cover assembly line 700 into a casing 12 on the second assembly line 502b, a film case assembling device 524 (assembling mechanism) for mounting a lid 14 on the first assembly line 502a on a casing 12 on the second assembly line 502b to produce a film case 10, a defective product removing device 526 for discharging a defective film case 10, and a transfer device 528 for transferring a film case 10 onto the feed line 908.

Figure 8:
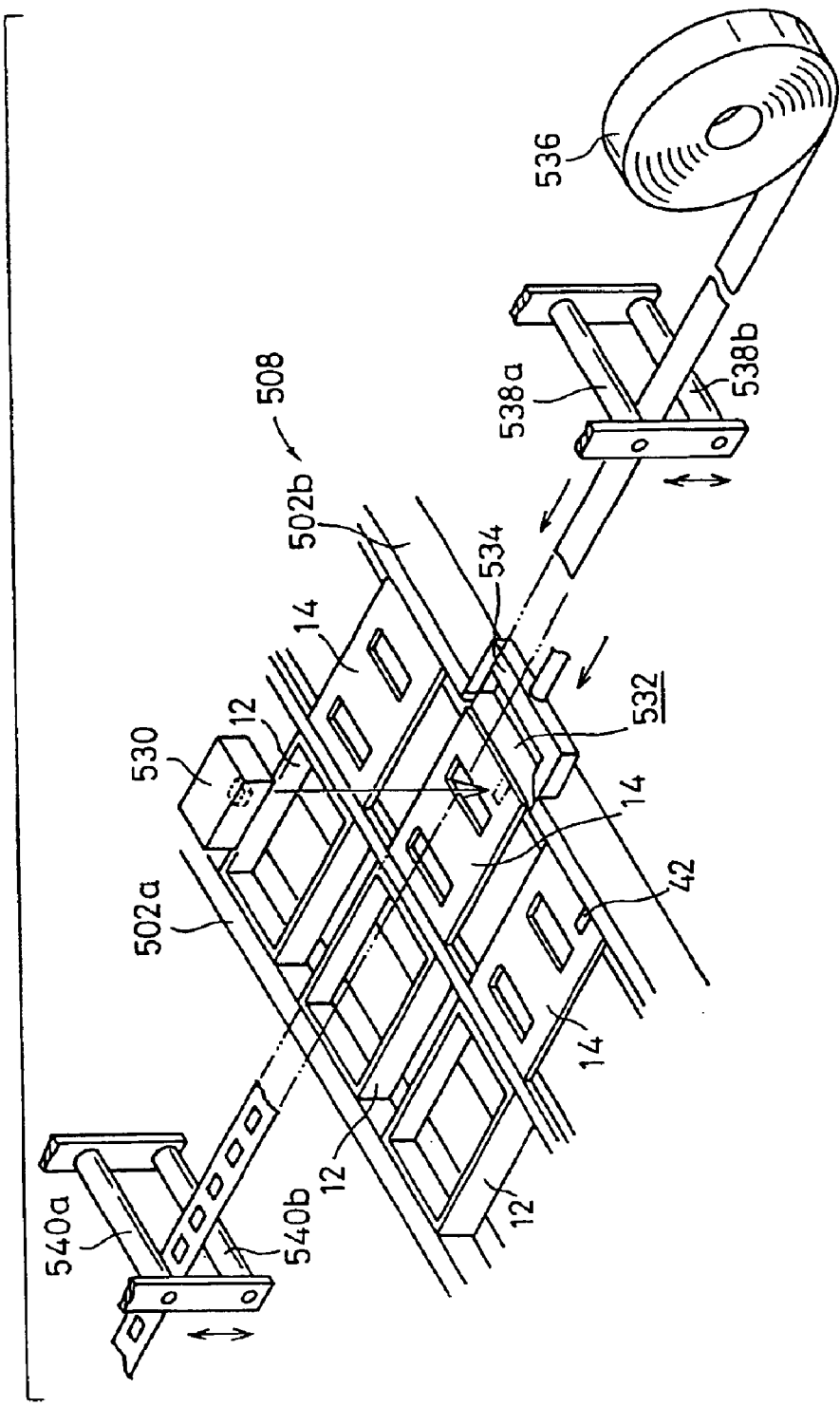
FIG. 8 is a perspective view of a foil applying device on a main assembly line of the film case manufacturing system according to the present invention.
Figure 9:
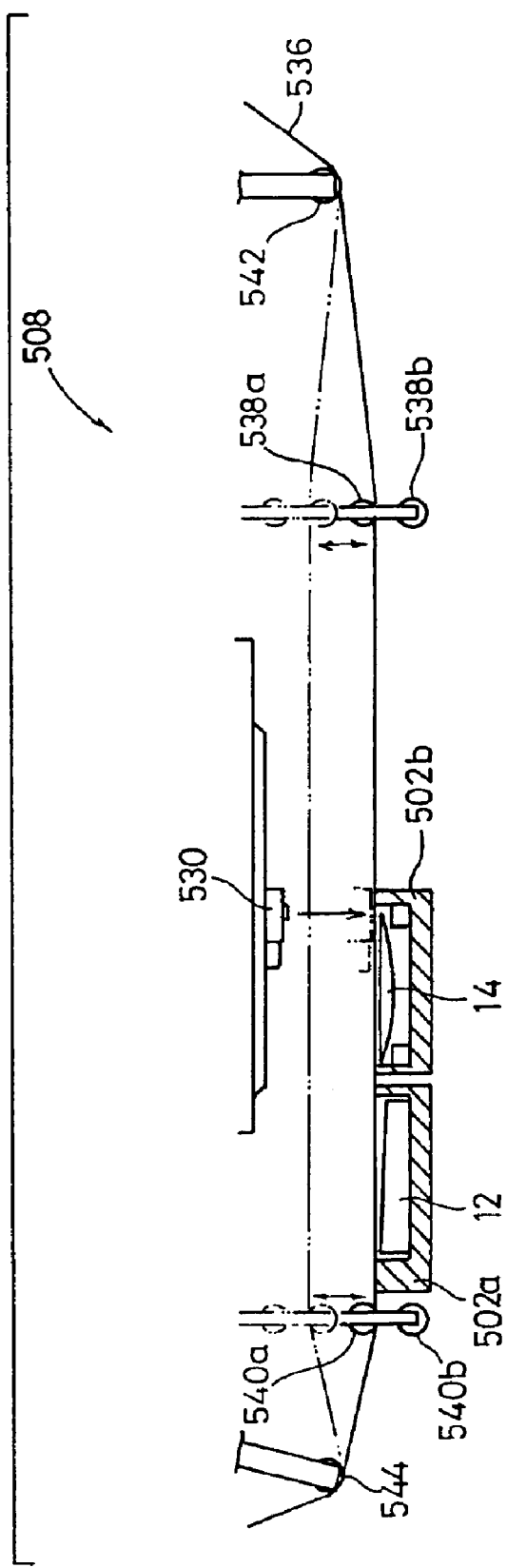
FIG. 9 is a side elevational view showing the manner in which the foil applying device operates.

FIGS. 8 and 9 show the foil applying device 508 disposed on the second assembly line 502b. The foil applying device 508 comprises a heating head 530 disposed above a region of a lid 14 where a foil 42 will be applied, and a positioning member 534 for positioning a lid 14 through a groove 532 defined in a side of the second assembly line 502b. The foil 42 is applied to the lid 14 from a foil ribbon 536 supplied from a reel when the foil ribbon 536 is heated by the heating head 530. Pairs of vertically movable roller 538a, 538b and 540a, 540b for holding the foil ribbon 536 are disposed one on each side of the first assembly line 502a and the second assembly line 502b. Tension rollers 542, 544 for tensioning the foil ribbon 536 are disposed outwardly of the pairs of vertically movable roller 538a, 538b and 540a, 540b.

Figure 10:
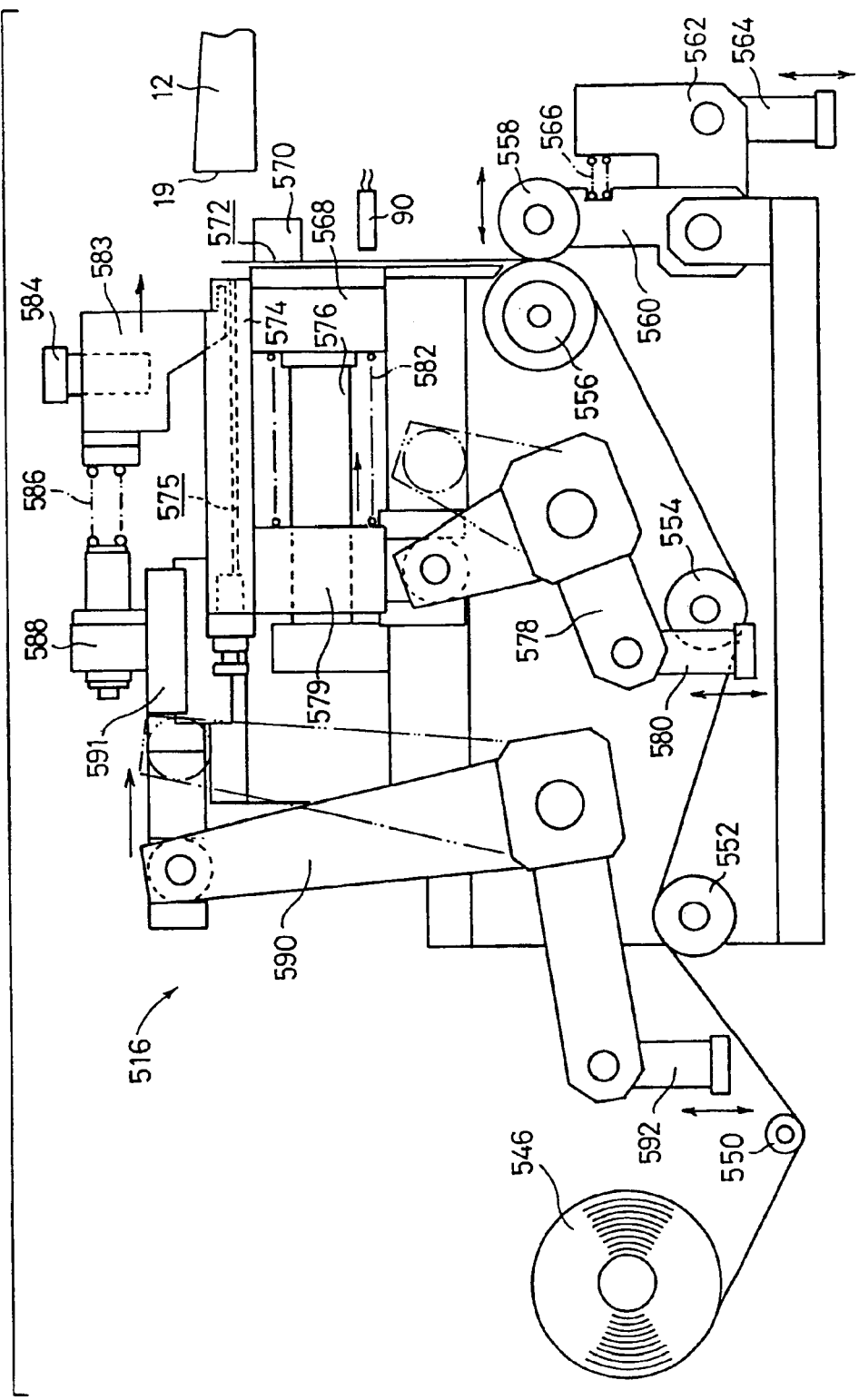
FIG. 10 is a side elevational view of a light-shielding sheet temporarily applying device of the film case manufacturing system according to the present invention.
Figure 11:
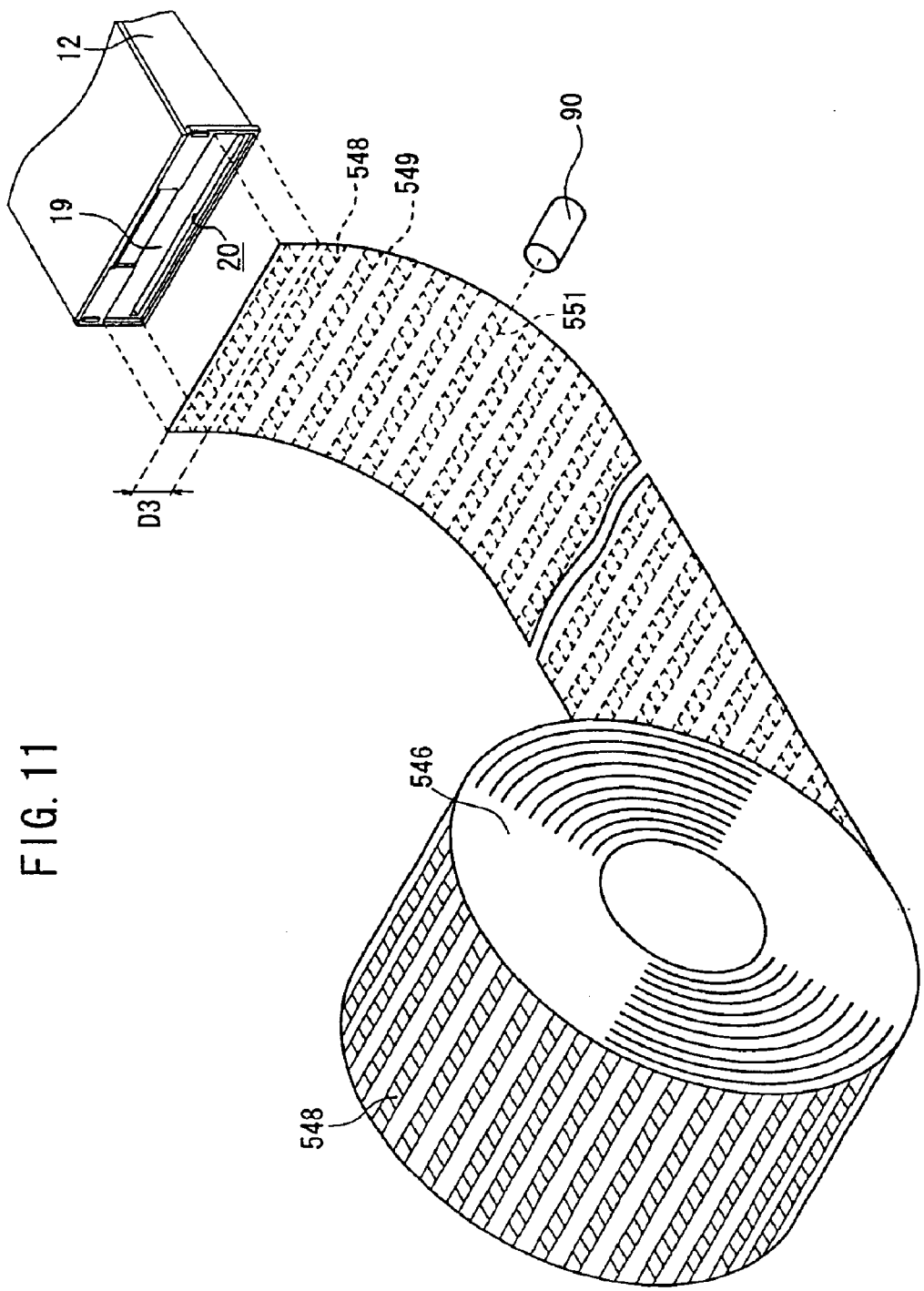
FIG. 11 is a perspective view showing the manner in which the light-shielding sheet temporarily applying device operates to supply light-shielding sheets.

FIG. 10 shows in side elevation the light-shielding sheet temporarily applying device 516 disposed on the first assembly line 502a. The light-shielding sheet temporarily applying device 516 is a device for cutting off a light-shielding sheet ribbon 546 supplied from a reel into a light-shielding sheet 22 of given width, and applying the light-shielding sheet 22 to the end face 19 of a casing 12. The light-shielding sheet ribbon 546 has a plurality of hot-melt adhesive regions 548 spaced at intervals, as shown in FIG. 11.

The light-shielding sheet ribbon 546 is supplied by rollers 550, 552, 554 and a feed roller 556. A nip roller 558 is separably held against the feed roller 556. The nip roller 558 is rotatably supported on an end of a first link 560 that serves as a switching mechanism angularly movable about its other end. A substantially L-shaped second link 562 has an end angularly movably supported on the other end of the first link 560. A third link 564 is angularly movably supported on an angular corner of the second link 562. The other end of the first link 560 and the other end of the second link 562 are couple to each other by a spring 566. When the third link 564 is displaced, the second link 562 is angularly moved to cause the spring 566 to press the nip roller 558 against the feed roller 556 or separate the nip roller 558 from the feed roller 556.

A holder 568 for holding the end of the light-shielding sheet ribbon 546 and a fixed blade 570 are disposed above the feed roller 556 and the nip roller 558. The holder 568 and the fixed blade 570 define a slit 572 therebetween for passing the light-shielding sheet ribbon 546 therethrough. The holder 568 is movable toward the fixed blade 570 along a guide bar 576. A sensor 90 for detecting the hot-melt adhesive regions 548 of the light-shielding sheet ribbon 546 is positioned downwardly of the fixed blade 570.

A movable blade 574, which cooperates with the fixed blade 570 in making up a cutting mechanism for cutting the light-shielding sheet ribbon 546, is disposed on the holder 568. The movable blade 574 is movable along the guide bar 576 that extends horizontally through the holder 568, for cutting off the light-shielding sheet ribbon 546 that projects a predetermined distance from the slit 572 in coaction with the fixed blade 570. The movable blade 574 has an attraction hole 575 for attracting a light-shielding sheet 22 that has been cut off into the light-shielding sheet ribbon 546 under a vacuum.

A substantially L-shaped first link 578 has an end coupled to the movable blade 574 by a joint 579 which is movable along the guide bar 576. The first link 578 is angularly movable about its angular corner, and a second link 580 is angularly movably supported on the other end of the first link 578. When the second link 580 is displaced, the first link 578 is angularly moved, displacing the movable blade 574. A spring 582 is interposed between the joint 579 and the holder 568 for moving the holder 568 toward the fixed blade 570.

The movable blade 574 has a recess (not shown) defined in an upper surface thereof and receiving a temporary applicator 583 having an end projecting toward the end face 19 of the casing 12 and slidable along the movable blade 574. The temporary applicator 583 has a heater 584 embedded therein which heats the projecting end of the temporary applicator 583. A holder 588 is coupled to the temporary applicator 583 by a spring 586, and a substantially L-shaped first link 590 has an end coupled to the holder 588 by a joint 591. The first link 590 is angularly movable about its angular corner, and a second link 592 is angularly movably supported on the other end of the first link 590. When the second link 592 is displaced, the first link 590 is angularly moved to displace the temporary applicator 583 independently of the movable blade 574.

Structural details of the presser supply machine 200 will be described below with reference to FIGS. 12 and 13.

The presser supply machine 200 (first presser supply mechanism) comprises a roller conveyor 204 for feeding a container 202 with a number of pressers 44 (first pressers) stored in stacks therein, and a transfer device 206 disposed above the roller conveyor 204 for attracting and transferring pressers 44 onto a feed line 208 which comprises a pitch-fed conveyor. A vertical ball screw 210 is disposed below the roller conveyor 204 and threaded through a nut 212. When the nut 212 is vertically moved upon rotation of the vertical ball screw 210, a lifter pin 214 coupled to the nut 212 is vertically moved. When the lifter pin 214 is lifted, it enters the container 202 from below, lifting stacked pressers 44 out of the container 202.

The transfer device 206 has a guide mechanism 218 supported by a frame 216. The guide mechanism 218 has a positioning frame 220 for positioning stacked pressers 44 in the container 202. The positioning frame 220 is vertically movable by a cylinder 222. A nozzle 224 for horizontally ejecting discharging air Air (discharging air applying mechanism) is disposed in the vicinity of the positioning frame 220.

The transfer device 206 also has an attracting mechanism 226 supported by the frame 216. The attracting mechanism 226 has a first displacing unit 230 horizontally displaceable along guide rails 228a, 228b fixedly mounted on the frame 216. The first displacing unit 230 has a second displacing unit 234 vertically displaceable along guide rails 232a, 232b. A plurality of suction cups 238 are connected by a support plate 236 to the lower end of the second displacing unit 234. Guide plates 240a, 240b are disposed on opposite sides of the suction cups 238 for stably holding attracted pressers 44.

As shown in FIG. 3, the presser supply machine 300 (second presser supply mechanism) comprises a roller conveyor 304 for feeding a container 302 with a number of pressers 46 (second pressers) stored in stacks therein, and a transfer device 306 disposed above the roller conveyor 304 for attracting and transferring pressers 46 onto a feed line 308 which comprises a pitch-fed conveyor.

The film cover supply machine 400 comprises a roller conveyor 404 for feeding a container 402 with a number of film covers 18 stored in stacks therein, and a transfer device 406 disposed above the roller conveyor 404 for attracting and transferring film covers 18 onto a feed line 408 which comprises a pitch-fed conveyor.

The presser supply machine 300 and the film cover supply machine 400 are similar in structure to the presser supply machine 200 except that they lack the nozzle 224 for ejecting discharging air Air, and will not be described in detail below.

The presser assembly line 600 comprises a pitch-fed conveyor 602 (presser feed line), and has an end connected to the feed line 308 for supplying pressers 46 and the other end connected to the second assembly line 502b of the main assembly line 500. The feed line 208 for supplying pressers 44 is connected to an intermediate section of the pitch-fed conveyor 602.

The feed line 308 and the pitch-fed conveyor 602 are connected to each other by a transfer device 604 for transferring pressers 46 onto the pitch-fed conveyor 602. The feed line 208 and the pitch-fed conveyor 602 are connected to each other by a transfer device 606 for transferring pressers 44 onto the pitch-fed conveyor 602 and placing them on pressers 46 that are fed by the pitch-fed conveyor 602. As sown in FIG. 14, the pitch-fed conveyor 602 has four positioning pins 608a through 608d. The positioning pins 608a through 608d include central positioning pins 608b, 608c for engaging in the round holes 48a, 48b in the presser 44 through the opening 54 in the presser 46 and side positioning pins 608a, 608b for engaging in the round holes 56a, 56b in the presser 44 thereby to positioning the pressers 44, 46 with respect to each other.

An ultrasonic sealing device 610 (joining and fixing mechanism) for bonding pressers 44, 46 at ends thereof and a transfer device 612 for transferring bonded pressers 44, 46 to the presser mounting device 512 on the main assembly line 500 are successively disposed on the presser assembly line 600 downstream of the transfer device 606.

The film cover assembly line 700 comprises a pitch-fed conveyor 702 (film cover feed line), and has an end connected to the feed line 408 for supplying film covers 18 and the other end connected to the second assembly line 502b of the main assembly line 500.

The feed line 408 and the pitch-fed conveyor 702 are connected to each other by a transfer device 704 for transferring film covers 18 onto the pitch-fed conveyor 702. On the pitch-fed conveyor 702, there are successively disposed a light-shielding sheet temporarily applying device 706 (first light-shielding sheet mounting mechanism) for temporarily applying a light-shielding sheet 26 (first light-shielding sheet) to a film cover 18, a light-shielding sheet finally applying device 708 for finally applying a light-shielding sheet 26, a light-shielding sheet bending device 710 for bending a light-shielding sheet 26 into a substantially L shape, a film cover inverting device 712 for inverting a film cover 18 upside down, a light-shielding sheet temporarily applying device 714 (second light-shielding sheet mounting mechanism) for temporarily applying a light-shielding sheet 28 (second light-shielding sheet), a light-shielding sheet finally applying device 716 for finally applying a light-shielding sheet 28, a light-shielding sheet notching device 718 for making a notch 29 (see FIGS. 15 and 16) in a side edge of a light-shielding sheet 28, and a light-shielding sheet bending device 720 for slightly bending a side edge of a light-shielding sheet 28 and also bending a light-shielding sheet 28 at the recess 29 in the side edge thereof.

The light-shielding sheet temporarily applying devices 706, 714 are basically identical in structure to the light-shielding sheet temporarily applying device 516 shown in FIG. 10, and will not be described in detail below. The light-shielding sheet bending device 720 has a first bending die 722 (see FIG. 15) for bending a side edge of a light-shielding sheet 28 and a second bending die 724 (see FIG. 16) for bending a light-shielding sheet 28 at the recess 29 in the side edge thereof.

Figure 17:
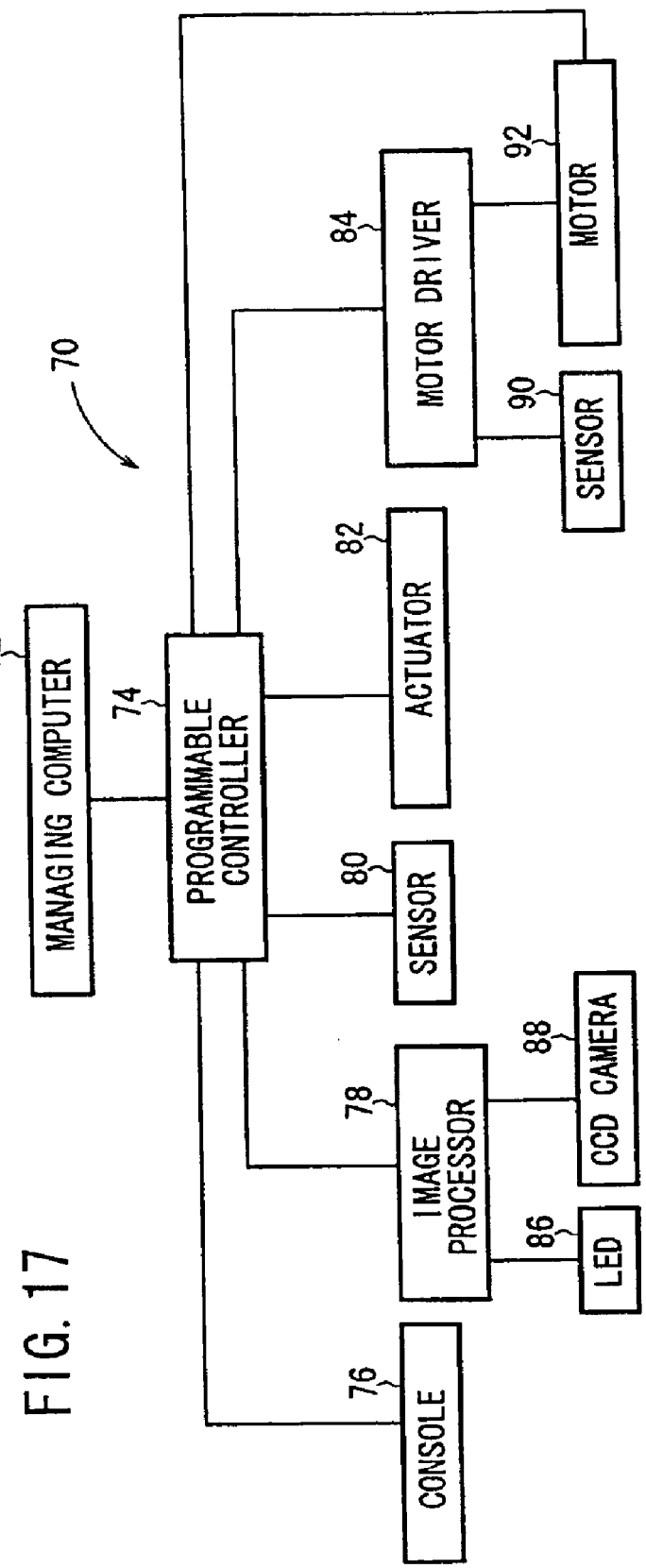
FIG. 17 is a block diagram of a control circuit of the film case manufacturing system according to the present invention.

FIG. 17 shows a control circuit 70 of the film case manufacturing system 60 thus constructed. As shown in FIG. 17, the control circuit 70 comprises a managing computer 72 for collecting data and managing the overall film case manufacturing system 60 and a programmable controller 74 for controlling operation of the film case manufacturing system 60 according to a process program under the control of the managing computer 72. To the programmable controller 74, there are connected a console 76 operated by the operator, an image processor 78, various sensors 80, various actuators 82 for actuating cylinders, motors, and other components to operate the film case manufacturing system 60, and a motor driver 84 and a motor 92 for actuating the feed roller 556 and other devices of the light-shielding sheet temporarily applying device 516.

LEDs 86 for illuminating necessary areas and CCD cameras 88 for capturing images of the illuminated areas are connected to the image processor 78. The CCD cameras 88 are positioned in respective inspecting stations C1 through C12 shown in FIG. 3. The inspecting station C1 inspects a casing 12 and a lid 14 for a positional misalignment of the lid 14 from the casing 12. The inspecting station C2 inspects a casing 12 and a lid 14 for their separation from each other. The inspecting station C3 inspect an applied state of a foil 42. The inspecting station C4 inspects an applied state of a light-shielding sheet 22. The inspecting station C5 inspects a light-shielded state achieved by a light-shielding sheet 28. The inspecting station C6 inspects how a lid 14 is mounted on a casing 12. The inspecting station C7 inspects a presser 46 to ascertain whether its face or reverse side is exposed and whether there is a presser 46 or not. The inspecting station C8 inspects a presser 44 to ascertain whether its face or reverse side is exposed and whether there is a presser 44 or not. The inspecting station C9 inspects an assembled state of pressers 44, 46. The inspecting station C10 inspects a film cover 18 to ascertain whether its face or reverse side is exposed and whether there is a film cover 18 or not. The inspecting station C11 inspects an applied state of a light-shielding sheet 26. The inspecting station C12 inspects an applied state of a light-shielding sheet 28.

A sensor 90 and the motor 92 are directly connected to the motor driver 84. The motor driver 84 is capable of directly controlling the motor 92 based on a detected signal supplied from the sensor 90.

The film case manufacturing system 60 according to the present invention is basically constructed as described above. Operation of the film case manufacturing system 60 will be described below with reference to a flowchart shown in FIG. 18.

First, operation of the casing/lid supply machine 100 will be described below.

Figure 18:
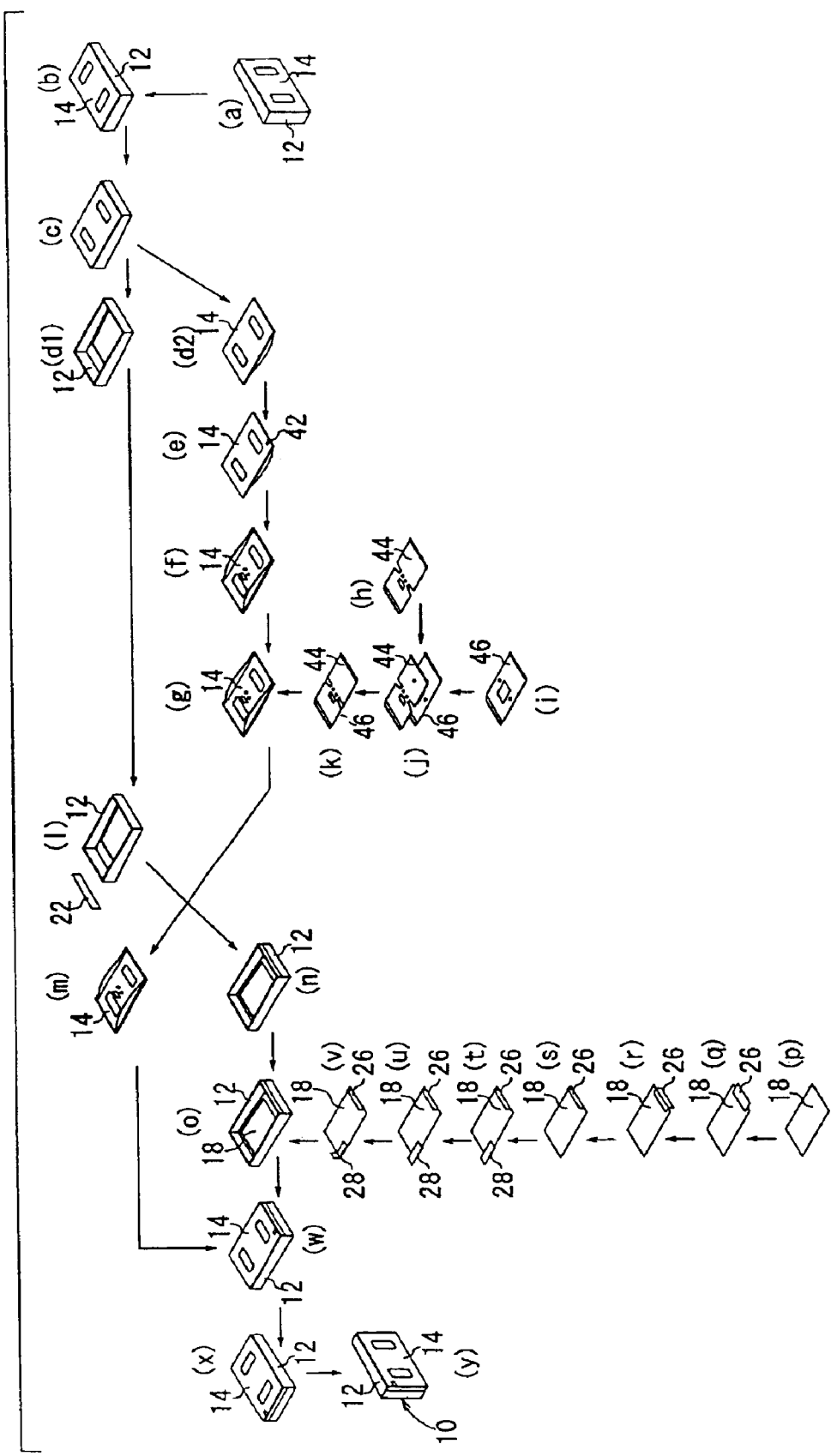
FIG. 18 is a flowchart showing a manufacturing process performed by the film case manufacturing system according to the present invention.

A combination of a casing 12 and a lid 14 is stored in a horizontal attitude in each bin 104 of a container 102, and supplied while being stored in the container 102 (see (a) in FIG. 18). A stack of containers 102 with combinations of casings 12 and lids 14 stored therein is placed on the roller conveyor 106. The roller conveyor 106 feeds the stacked containers 102 to the lift mechanisms 108, and then is temporarily stopped. The lift mechanisms 108 insert their arms into the grooves 110 in the second container 102 from below and then lift the arms to separate the second container 102 and those on the second container 102 from the first container 102 on the roller conveyor 106. The roller conveyor 106 is actuated again to feed only the first container 102 toward the lifting and lowering mechanism 112.

When the container 102 is placed on the table 114 of the lifting and lowering mechanism 112, as shown in FIG. 5, the motor 134 is energized to move the chain 132 to lift the table 114 along the guide bars 126a, 126b. When the container 102 is lifted to a certain position, the ascending movement of the table 114 is stopped, and then the motor 124 is energized to turn the table 114 by 90° about the rotatable shaft 120. At this time, the container 102 is supported by the support plate 116, and the casings 12 and the lids 14 stored in the container 102 are prevented from being ejected out of the container 102 by the ejection prevention wall 142 disposed on the front side of the container 102 that has been turned.

Then, the lower end of the container 102 that has been brought into an upright position by the table 114 is engaged by the dog 140 of the displacement plate 138, which then moves along the guide fail 136 to displace the container 102 onto the lifting and lowering table 144 (see FIGS. 4 and 6).

When the container 102 is placed on the lifting and lowering table 144, the pushing mechanism 146 on one side thereof is actuated to push the casings 12 and the lids 14 out of the container 102 (see FIGS. 6 and 7). Specifically, the pusher pins 158 of the pushing mechanism 146, which have initially been positioned in horizontal alignment with bins 104 in the lower half of the container 102 on the lifting and lowering table 144, are displaced toward the container 102 when the cylinder 152 is actuated, pushing the casings 12 and the lids 14 out of those bins 104 of the container 102. The casings 12 and the lids 14 thus pushed out of the container 102 are placed into corresponding bins 162 in the buffer magazine 160 that is positioned adjacent to the container 102 remotely from the pushing mechanism 146.

The casings 12 and the lids 14 placed in the buffer magazine 160 are then removed from the buffer magazine 160 by the removing mechanism 172 that is waiting over the feed line 186. The support plate 184 displaced by the cylinder 180 is disposed on the feed line 186. When the cylinder 176 is actuated, the suction cups 178 are displaced forward into a horizontal array of bins 162 of the buffer magazine 160 and attract sides of the casings 12 in the bins 162. The suction cups 178 are then retracted to remove a horizontal array of casings 12 and lids 14 from the bins 162 and place them onto the support plate 184. Thereafter, the support plate 184 is retracted to transfer the casings 12 and the lids 14 onto the feed line 186. The feed line 186 then feeds the casings 12 and the lids 14 toward the main assembly line 500 (see (b) in FIG. 18).

After the horizontal array of casings 12 and lids 14 has been removed from the buffer magazine. 160, the motor 170 is energized to cause the belt 168, the pinion 166, and the racks 164, 164b to lift the buffer magazine 160 by a distance corresponding to a horizontal array of bins therein. The removing mechanism 172 then removes a next horizontal array of casings 12 and lids 14 from the buffer magazine 160, and supplies them onto the feed line 186.

When all the casings 12 and the lids 14 have been removed from the buffer magazine 160, the container 102 is lowered by a distance corresponding to one half of the vertical length of the container 102, and the buffer magazine 160 is also lowered into a position aligned with the upper half of the container 102. Then, the pushing mechanism 146 is actuated to push the casings 12 and the lids 14 stored in the remaining bins 104 into the buffer magazine 160.

By thus supplying the casings 12 and the lids 14 via the buffer magazine 160 onto the feed line 186, the difference between the rate at which the casings 12 and the lids 14 are supplied by the container 102 and the rate at which the casings 12 and the lids 14 are fed by the feed line 186 can be adjusted to supply the casings 12 and the lids 14 efficiently to the main assembly line 500.

The container 102 from which all the casings 12 and the lids 14 have been removed is lowered to a lowest position by the lifting and lowering table 144, and then transferred onto the roller conveyor 194 by the pushing mechanism 188 that is waiting alongside of the lowered container 102. Specifically, the cylinder 190 is actuated to move the pusher plate 192 to push the container 102 onto the roller conveyor 194.

As shown in FIG. 3, the empty container 102 transferred onto the roller conveyor 194 is fed across and below the feed line 186 to the transfer mechanism 196, whose movable arm 198 is operated to transfer the empty container 102 onto the roller conveyor 802 of the container feed line 800. The roller conveyor 802 feeds the empty container 102 to the transfer mechanism 902 along the main assembly line 500. The transfer mechanism 902 transfers the container 102 onto the roller conveyor 906 with the movable arm 904. The roller conveyor 906 feeds the transferred container 102 across and below the feed line 908 to a standby position in front of the buffer magazine 910 of the film case stacking machine 900.

The casings 12 and the lids 14 supplied to the feed line 186 are fed to the main assembly line 500. While the casings 12 and the lids 14 are being fed to the main assembly line 500, the inspecting station C1 inspects, with a sensor or the like (not shown), whether each lid 14 is positionally misaligned and reversely oriented with respect to the corresponding casing 12. Any casings 12 and lids 14 which have been judged as being positionally misaligned are discharged out of the feed line 186 by the defective product removal device 199 positioned at the terminal end of the feed line 186.

Casings 12 and lids 14 which have been judged as being positionally aligned with each other are turned 90° and transferred onto the first assembly line 502a of the main assembly line 500 by the transfer device 504 disposed at the terminal end of the feed line 186 (see (c) in FIG. 18).

After a casing 12 and a lid 14 that have been placed on the first assembly line 502a are fed to the transfer device 506, only the lid 14 placed on the casing 12 is transferred onto the second assembly line 502b (see (d1), (d2) in FIG. 18). The inspecting station C2 disposed on the first assembly line 502a downstream of the transfer device 506 inspects whether the casing 12 and the lid 14 have been separated from each other by the transfer device 506 or not.

The lid 14 is fed by the second assembly line 502b to the foil applying device 508, which applies a foil 42 to an end of the face side of the lid 14 (see (e) in FIG. 18). Operation of the foil applying device 508 will be described below with reference to FIGS. 8 and 9.

The foil ribbon 536 is stretched across and over the second assembly line 502b. The foil ribbon 536 is held by the pairs of vertically movable roller 538a, 538b and 540a, 540b disposed on both sides of the first assembly line 502a and the second assembly line 502b. For applying the foil 42 to the lid 14, the pairs of vertically movable roller 538a, 538b and 540a, 540b are lowered to bring the foil ribbon 536 closely toward the lid 14. The heating head 350 is then lowered to press the foil ribbon 536 against the lid 14, thus transferring and applying a foil 42 to the lid 14.

After the foil 42 has been applied to the lid 14, the heating head 530 is lifted, and the pairs of vertically movable roller 538a, 538b and 540a, 540b are also lifted. Since the foil ribbon 536 is forcibly peeled off the lid 14 by the pairs of vertically movable roller 538a, 538b and 540a, 540b, the lid 14 with the foil 42 applied thereto can smoothly be fed downstream without fail.

Whether the foil ribbon 536 has reliably been peeled off or not can be confirmed by a photoswitch or the like which detects the peeling of the foil ribbon 536 in the position where the foil 42 is applied when the pairs of vertically movable roller 538a, 538b and 540a, 540b are lifted to their upward stroke end after the foil 42 is transferred.

The foil 42 applied to the lid 14 is imaged by the CCD camera 88 disposed in the downstream inspecting station C3, which inspects the foil 42 for its applied state.

Then, the lid 14 is fed to the lid inverting device 510, which inverts the lid 14 so that its ledges 32a, 32b are oriented upwardly (see (f) in FIG. 18). Thereafter, the lid 14 is fed to the presser mounting device 512, which mounts pressers 44, 46 on the lid 14 (see (g) in FIG. 18).

Operation of the presser supply machines 200, 300 to supply pressers 44, 46 to the presser mounting device 512 will be described below.

Pressers 44 are stored in stacks in a container 202 and supplied in the container 202 (see (f) in FIG. 18). The container 202 is fed to the transfer device 206 by the roller conveyor 204. As shown in FIGS. 12 and 13, the cylinder 222 of the guide mechanism 218 is actuated to lower the positioning frame 220 into engagement with the container 202. Then, the ball screw 210 positioned below the roller conveyor 204 is rotated about its own axis to elevate the nut 212 to insert the pusher pin 214 into the container 202 from below. The tip end of the pusher pin 214 lifts stacks of pressers 44. After the pressers 44 have been lifted a predetermined distance, the ball screw 210 is stopped, and the nozzle 224 disposed on one side of the positioning frame 220 applies discharging air Air to sides of the pressers 44.

Figure 13:
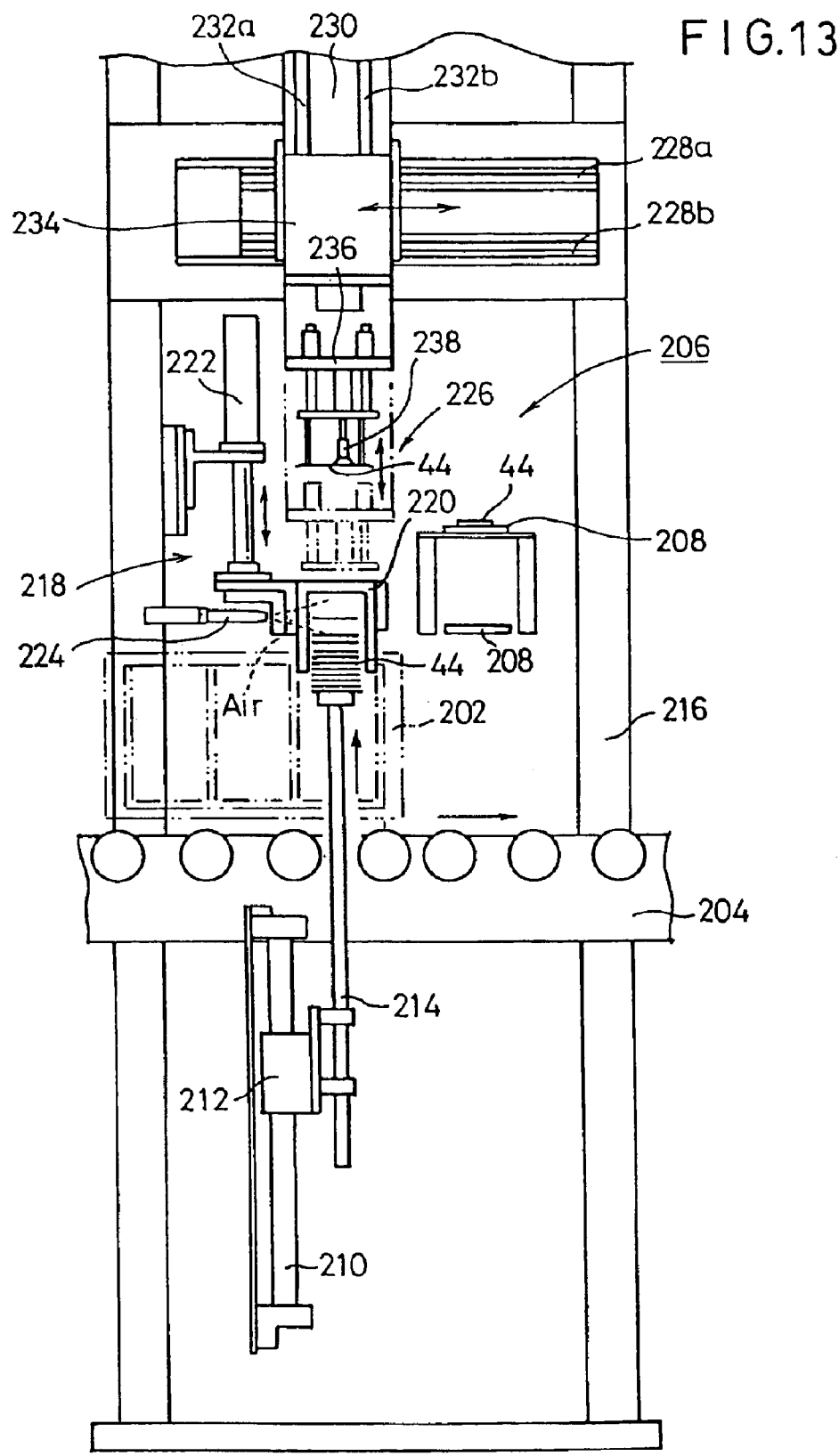
FIG. 13 is a side elevational view of the transfer machine of the presser supply machine.

The applied discharging air Air serves to remove electric charges from the pressers 44, and separates the pressers 44 one by one, causing the uppermost pressers 44 to float (see FIG. 13). The discharging air Air is thus effective to transfer the pressers 44 reliably one by one.

The second displacing unit 234 is lowered along the guide rails 232a, 232b to a position where the uppermost pressers 44 are attracted by the corresponding suction cups 238. At this time, the guide plates 240a, 240b disposed on both sides of the suction cups 238 are held against the pressers 44 to hold the pressers 44 stably. Then, the second displacing unit 234 is lifted, and thereafter the first displacing unit 230 is horizontally moved along the guide rails 228a, 228b to position the pressers 44 above the feed line 208. Thereafter, the suction cups 238 are deactivated to place the pressers 44 onto the feed line 208. The feed line 208 then feeds the pressers 44 to the presser assembly line 600.

The presser supply machine 300 stores stacks of pressers 46 in a container 302 and supplies them in the container 302 (see (i) in FIG. 18). The container 302 is fed by the roller conveyor 304 to the transfer device 306, which transfers the pressers 46 onto the feed line 308. The pressers 46 are thicker than the pressers 44, and do not need to be discharged by discharging air Air. However, the pressers 46 may be discharged, if necessary.

The process of removing electric charges with discharging air Air is not limited to the pressers 44, but may be used in various applications where a plurality of thin objects that can possibly be electrically charged are supplied in stacks.

The pressers 46 fed by the feed line 308 are then transferred by the transfer device 604 onto the pitch-fed conveyor 602 of the presser assembly line 600. The CCD camera 88 in the inspecting station C7 inspects each presser 46 to ascertain whether its face or reverse side is exposed and whether there is a presser 46 or not.

Figure 14:
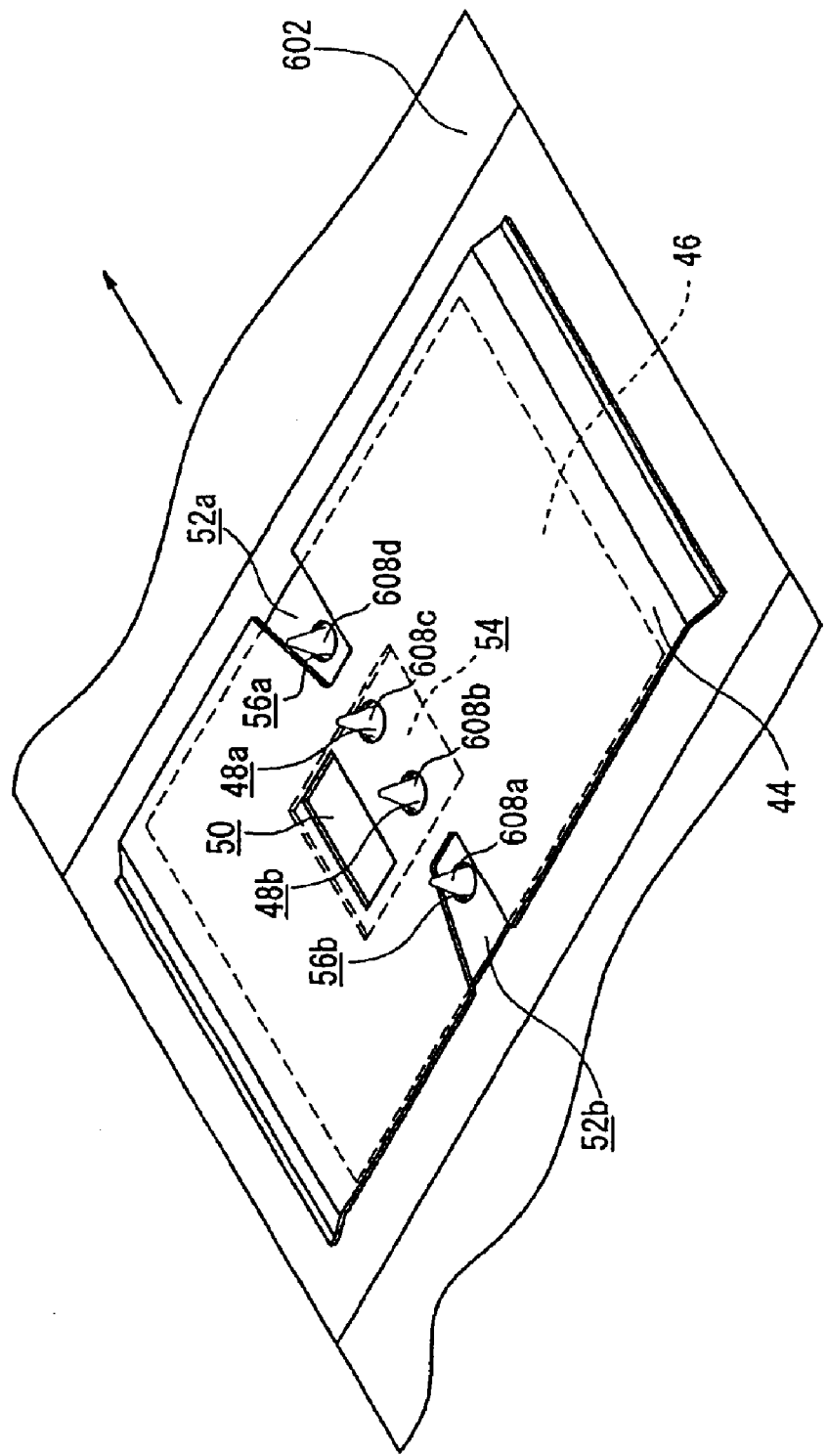
FIG. 14 is a fragmentary perspective view of a presser feed line of the film case manufacturing system according to the present invention.

In the junction between the feed line 208 and the presser assembly line 600, the transfer device 606 places a presser 44 on a presser 46 that is fed by the pitch-fed conveyor 602 (see (j) in FIG. 18). FIG. 14 shows the manner in which the presser 44 is placed on the presser 46. The pressers 44, 46 are positioned relatively to each other by the positioning pins 608a through 608d mounted on the pitch-fed conveyor 602. The presser 46 placed on the presser 44 is inspected as to whether its face or reverse side is exposed and whether there is a presser 46 or not in the inspecting station C8.

The pressers 44, 46 that have been superposed on each other are joined at one end thereof by the ultrasonic sealing device 610 (see (k) in FIG. 18). The joined pressers 44, 46 are inspected for their joined state by the CCD camera 88 in the inspecting station C9, and then fed to the transfer device 612 by the pitch-fed conveyor 602.

The transfer device 612 inverts the joined pressers 44, 46, upside down, and places them on a lid 14 disposed in the presser mounting device 512 on the main assembly line 500 (see (g) in FIG. 18). At this time, the crimping pins 40a, 40b on the lid 14 engage respectively in the round holes 48a, 48b in the presser 44, thus positioning the lid 14 and the pressers 44, 46 with respect to each other.

Then, the lid 14 on which the pressers 44, 46 have been mounted in the presser mounting device 512 is fed to the presser fixing device 514 by the second assembly line 502b. In the presser fixing device 514, the tip ends of the crimping pins 40a, 40b projecting out of the round holes 48a, 48b in the presser 44 are melted to join the pressers 44, 46 to the lid 14.

A casing 12 fed by the first assembly line 502a of the main assembly line 500 is delivered to the light-shielding sheet temporarily applying device 516, which temporarily applies a light-shielding sheet 22 to an end face 19 of the casing 12. Operation of the light-shielding sheet temporarily applying device 516 will be described below with reference to FIGS. 10 and 11.

When the casing 12 arrives at the light-shielding sheet temporarily applying device 516, the programmable controller 74 controls the feed roller 556 and the nip roller 558 to grip the light-shielding sheet ribbon 546, and then energizes the motor 92 to rotate the feed roller 556 to deliver the light-shielding sheet ribbon 546 between the holder 568 and the fixed blade 570. Specifically, as shown in FIG. 10, when the third link 564 is actuated, the second link 562 and the spring 566 turn the first link 560, pressing the nip roller 558 against the feed roller 556. Then, the feed roller 556 is rotated to deliver upwardly the light-shielding sheet ribbon 546 through the slit 572 between the holder 568 and the fixed blade 570.

As shown in FIG. 11, the sensor 90, which comprises a reflective sensor or the like, is disposed in a region where the light-shielding sheet ribbon 546 passes. The sensor 90 detects a boundary line 55a between a hot-melt adhesive region 548 and an adhesive-free region 549 on the light-shielding sheet ribbon 546. Based on a detected signal from the sensor 90, the motor driver 84 controls the motor 92 to feed the light-shielding sheet ribbon 546 accurately by a constant length D3.

Figure 19:
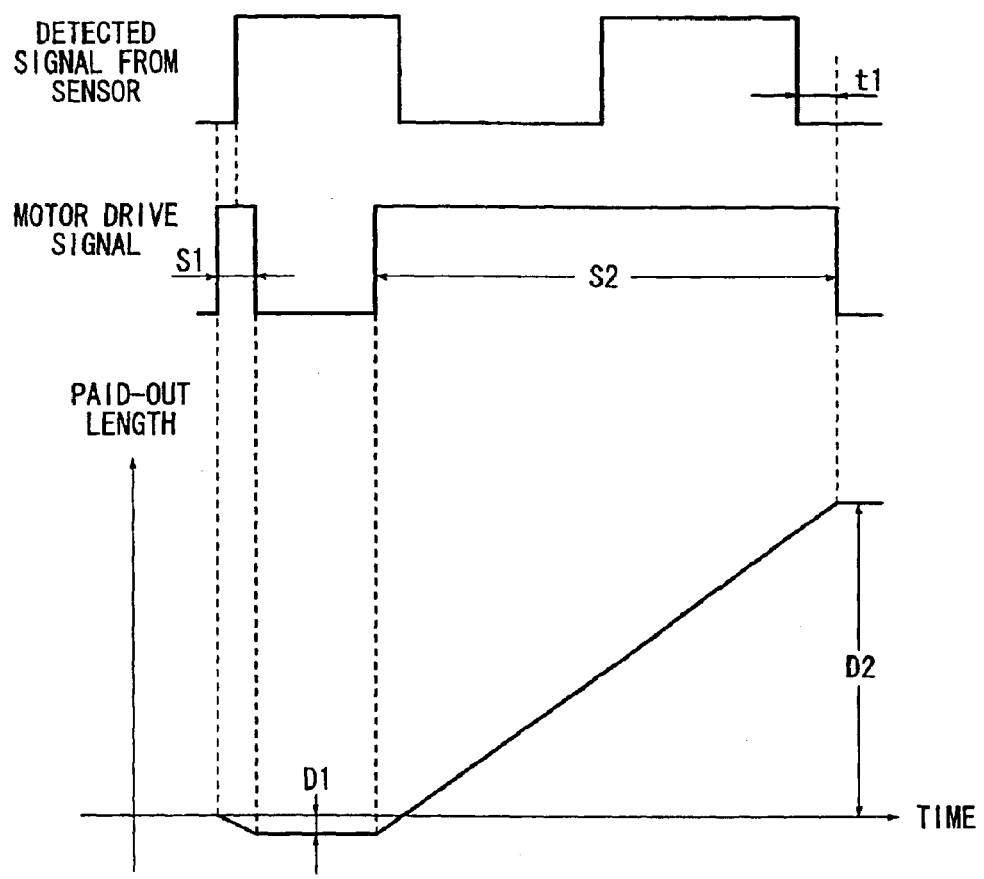
FIG. 19 is a timing chart of an operation sequence of a light-shielding sheet temporarily applying device according to a comparative example on the main assembly line.

Detailed operation of the programmable controller 74, the motor 92, the sensor 90, and related components will be described below. FIG. 19 is a timing chart of a comparative process based on operation commands from the programmable controller 74.

In the comparative process, the programmable controller 74 outputs a drive signal S1 to the motor 92 which drives the feed roller 556. In order to prevent the light-shielding sheet ribbon 546 from sticking to the fixed blade 570 and the movable blade 574, the motor 92 rotates the feed roller 556 according to the drive signal S1, pulling back the light-shielding sheet ribbon 546 by a length D1. If the sensor 90 detects a boundary line 55a between a hot-melt adhesive region 548 and an adhesive-free region 549 on the light-shielding sheet ribbon 546 at this time, then the detected signal from the sensor 90 goes high, i.e., has an ON level. Then, the programmable controller 74 outputs a drive signal S2 to the motor 92. The motor 92 rotates the feed roller 556 to deliver the light-shielding sheet ribbon 546 according to the drive signal S2. After the light-shielding sheet ribbon 546 has been delivered a predetermined length, the sensor 90 detects a next boundary line 551 and outputs a low or OFF-level signal. The programmable controller 74 outputs a de-energization signal to the motor 92 to stop the rotation of the feed roller 556. As a result, the light-shielding sheet ribbon 546 is delivered a given length D2 from the fixed blade 570.

If the feed roller 556 is driven by operation commands from the programmable controller 74 as in the above comparative example, the feed roller 556 tends to stop at different times due to the effect of the cycle time of the programmable controller 74. Specifically, a time t1 that elapses from the detection of a boundary line 551 on the light-shielding sheet ribbon 546 by the sensor 90 until the drive signal S2 for the motor 92 is turned off is not stable because it depends on the cycle time of the programmable controller 74. Therefore, the length D2 by which the light-shielding sheet ribbon 546 is delivered tends to be not constant.

Figure 20:
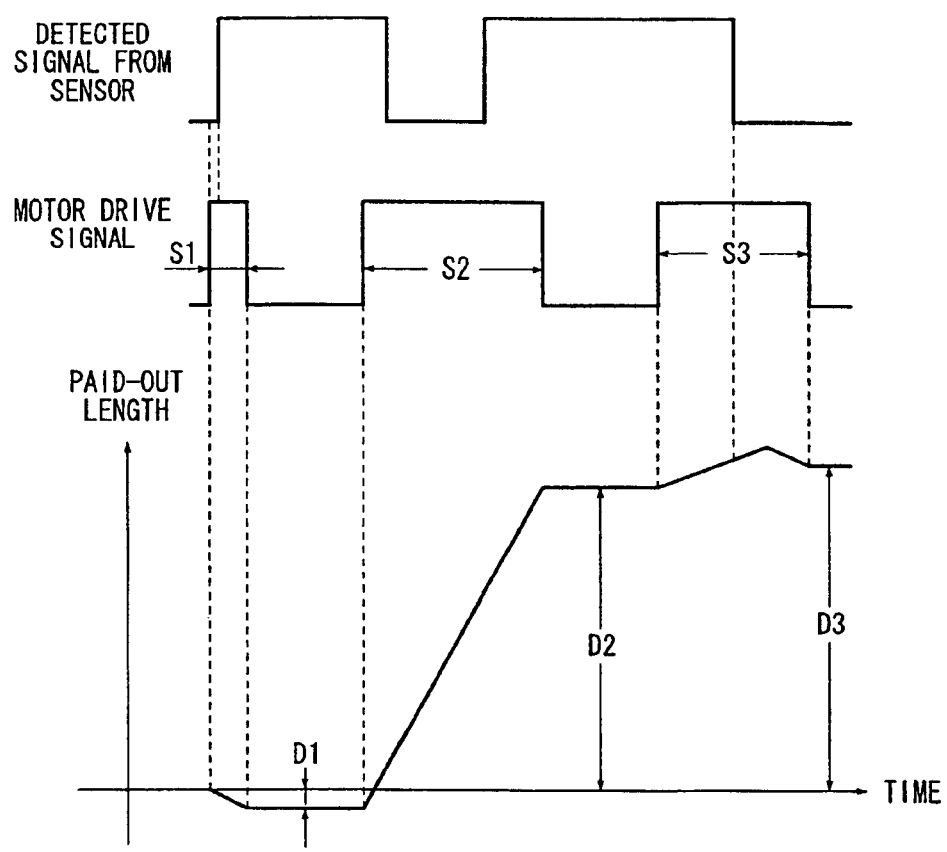
FIG. 20 is a timing chart of an operation sequence of the light-shielding sheet temporarily applying device according to the present invention on the main assembly line.

According to the embodiment of the present invention, as shown in FIG. 20, the feed roller 556 is rotated according to the drive signal S1 outputted from the programmable controller 74 to the motor 92 to pull back the light-shielding sheet ribbon 546 by the length D1 for thereby preventing the light-shielding sheet ribbon 546 from sticking to the fixed blade 570 and the movable blade 574. The mechanism for pulling back the light-shielding sheet ribbon 546 to prevent it from sticking to the fixed blade 570 and the movable blade 574 is also applicable to other uses than the light-shielding sheet ribbon 546.

Then, the feed roller 556 is rotated according to the drive signal S2 outputted from the programmable controller 74 to the motor 92 to deliver the light-shielding sheet ribbon 546 by the length D2, after which the delivery of the light-shielding sheet ribbon 546 is temporarily stopped.

Then, the programmable controller 74 outputs a drive signal S3 to the motor 92, and transfers control of the motor 92 to the motor driver 84. The motor 92 rotates the feed roller 556 at a low speed according to the drive signal S3, starting to pay out the light-shielding sheet ribbon 546 again. The motor driver 84 monitors the detected signal from the sensor 90. When the motor driver 84 receives a detected signal indicative of a boundary line 551, the motor driver 84 de-energizes the motor 92. At this time, since the motor 92 keeps rotating a certain angle due to the inertia, the light-shielding sheet ribbon 546 is continuously delivered an excessive length beyond the desired stop position. Therefore, the motor driver 84 reverses the motor 92 by an angle corresponding to the excessive length by which the light-shielding sheet ribbon 546 has been unreeled to pull back the light-shielding sheet ribbon 546.

By performing the above control process, the motor 92 is not affected by the cycle time of the programmable controller 74, and the feed roller 556 is rotated at a low speed and reversed an angle corresponding to the excessive length by which the light-shielding sheet ribbon 546 has been unreeled. Thus, the light-shielding sheet ribbon 546 can be stopped after it has been delivered accurately by the length D3 that is a desired length to be paid out.

After the light-shielding sheet ribbon 546 has been delivered accurately by the length D3, as shown in FIG. 10, the joint 579 is moved in the direction indicated by the arrow by the second link 580 and the first link 578. At this time, the holder 568 is displaced toward the fixed blade 570 by the spring 582, gripping the light-shielding sheet ribbon 546 in position between the holder 568 and the fixed blade 570. The movable blade 574 moving with the joint 579 cuts off the light-shielding sheet ribbon 546 gripped between the holder 568 and the fixed blade 570 into a light-shielding sheet 22, which is attracted to the movable blade 576 under a vacuum developed by the attraction hole 575 and pressed against the end face 19 of the casing 12.

The nip roller 558 which nips the light-shielding sheet ribbon 546 is released from the nipping engagement when the holder 568 grips the light-shielding sheet ribbon 546. The light-shielding sheet ribbon 546 is thus prevented from meandering in its travel.

The temporary applicator 583 disposed above the movable blade 574 is moved toward the casing 12 by the holder 588, the first link 590, and the second link 592 with a slight delay with respect to the movable blade 574, pressing a portion of the light-shielding sheet 22 against the end face 19 of the casing 12. At this time, a portion of the hot-melt adhesive region 548 of the light-shielding sheet 22 is melted by the end of the temporary applicator 583 which is heated by the heater 584, temporarily applying the light-shielding sheet 22 to the end face 19 of the casing 12 (see (1) in FIG.

18). The portion of the light-shielding sheet 22 which corresponds to the film discharge slot 20 in the end face 19 comprises the adhesive-free region 549, and hence is not bonded to the casing 12.

The casing 12 to which the light-shielding sheet 22 has temporarily been applied is fed to the light-shielding sheet finally applying device 518, which heats the light-shielding sheet 22 to finally apply the light-shielding sheet 22 to the casing 12. The light-shielding sheet 22 is imaged by the CCD camera 88 in the inspecting station C4, and inspected for its applied state, e.g., as to whether the light-shielding sheet 22 is bonded to the casing 12 in a proper position thereon or not.

The casing 12 with the light-shielding sheet 22 applied thereto and the lid 14 with the pressers 44, 46 mounted thereon are switched around in position by the exchanging device 520. The lid 14 is placed on the first assembly line 502*a* (see (m) in FIG. 18), and the casing 12 is placed on the second assembly line 502*b* (see (n) in FIG. 18).

The casing 12 is fed to the film cover inserting device 522, which inserts a film cover 18 with light-shielding sheets 26, 28 bonded thereto into the casing 12 (see (o) in FIG. 18).

Operation of the film cover supply machine 400 to supply a film cover 18 to the film cover inserting device 522 will be described below.

Film covers 18 are stored in stacks in a container 402 and supplied in the container 402 by the film cover supply machine 400 (see (p) in FIG. 18). The container 402 is fed to the transfer device 406. The film covers 18 fed to the transfer device 406 are attracted and transferred onto the feed line 408.

The film covers 18 fed by the feed line 408 are transferred onto the pitch-fed conveyor 702 of the film cover assembly line 700 by the transfer device 704. Then, the CCD camera 88 in the inspecting station C10 inspects each film cover 18 to whether its face or reverse side is exposed and whether there is a film cover 18 or not.

Then, the film cover 18 is fed to the light-shielding sheet temporarily applying device 706, which temporarily applies a light-shielding sheet 26 to an end of the film cover 18 (see (q) in FIG. 18). Operation of the light-shielding sheet temporarily applying device 706 is identical to operation of the light-shielding sheet temporarily applying device 516, and will not be described in detail below. The film cover 18 with the light-shielding sheet 26 applied thereto is fed to the light-shielding sheet finally applying device 708, which finally applies the light-shielding sheet 26 to the film cover 18. The applied film cover 18 is inspected for its applied state in the inspecting station C11.

The film cover 18 with the light-shielding sheet 26 finally applied thereto is fed to the light-shielding sheet bending device 710, which bends the light-shielding sheet 26 through 90° along a side edge of the film cover 18 (see (r) in FIG. 18).

The film cover 18 with the bent light-shielding sheet 26 is inverted upside down by the film cover inverting device 712 (see (s) in FIG. 18), and then fed to the light-shielding sheet temporarily applying device 714.

The light-shielding sheet temporarily applying device 714 temporarily applies a light-shielding sheet 28 to a corner of another side of the film cover 18 which is opposite to the side thereof where the light-shielding sheet 26 is applied (see (t) in FIG. 18). The light-shielding sheet 28 is applied such that a longitudinal side edge thereof projects slightly from the film cover 18. Then, the light-shielding sheet finally applying device 716 finally applies the light-shielding sheet 28 to the film cover 18, after which the light-shielding sheet notching device 718 makes a notch 29 in the light-shielding sheet 28 at a position aligned with the corner of the film cover 18 (see (u) in FIG. 18).

The film cover 18 with the notch 29 formed in the light-shielding sheet 28 is then inspected for an applied state of the light-shielding sheet 28 in the inspecting station C12, and thereafter fed to the light-shielding sheet bending device 720.

Figure 15:
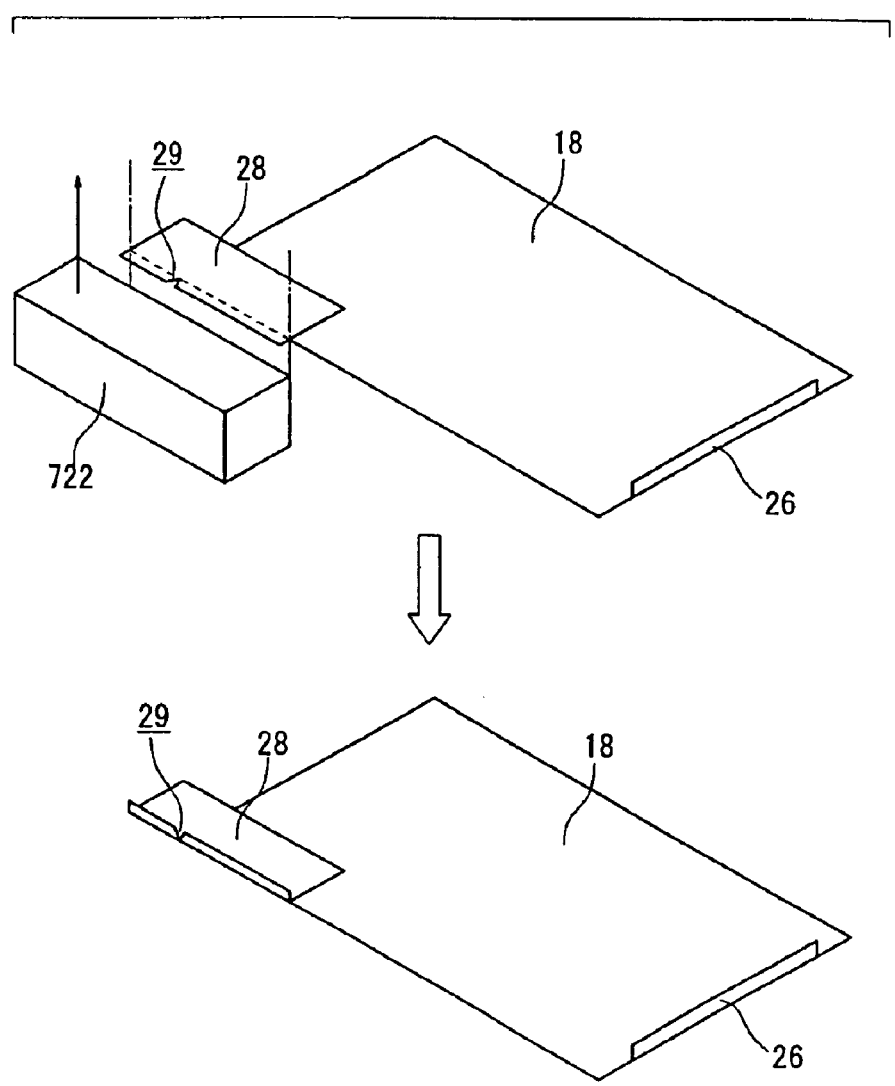
FIG. 15 is a perspective view of a light-shielding sheet folding device on the presser feed line.
Figure 16:
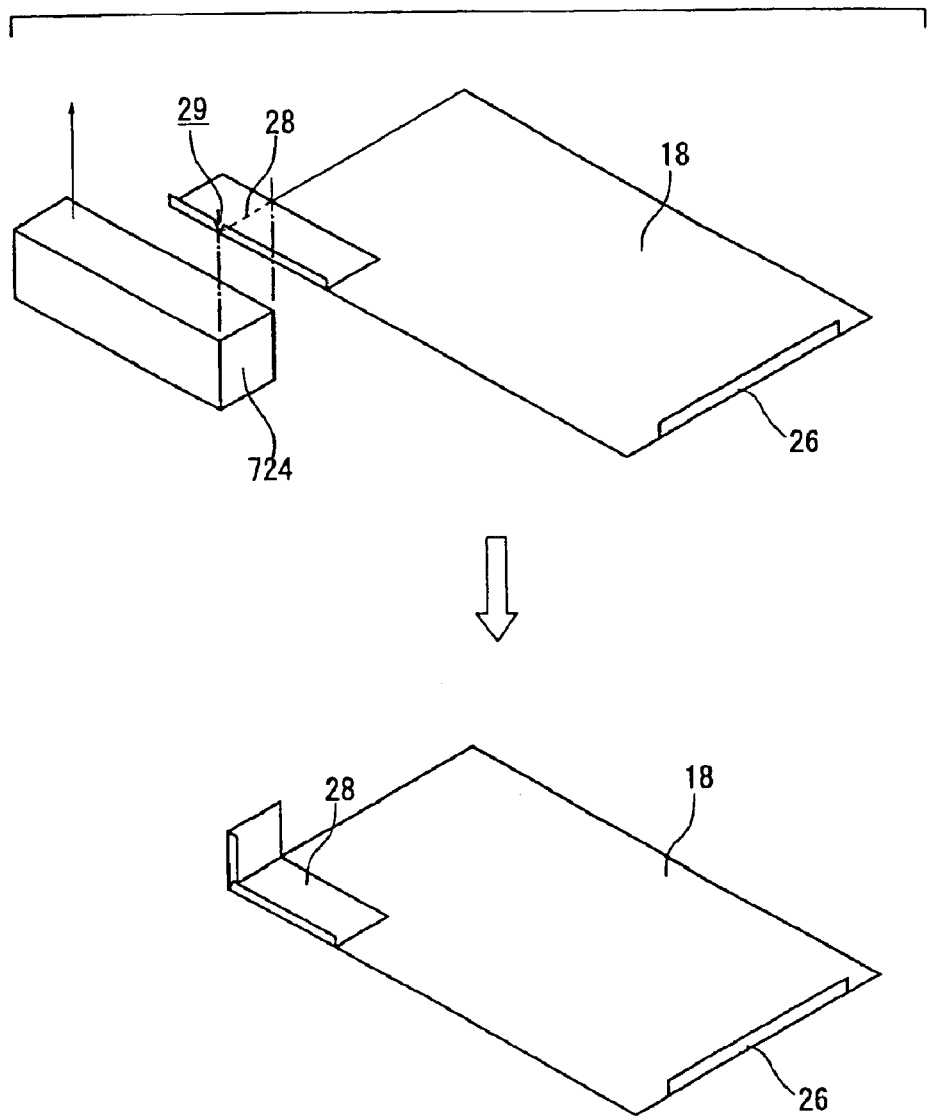
FIG. 16 is a perspective view of the light-shielding sheet folding device on the presser feed line.

In the light-shielding sheet bending device 720, the first bending die 722 bends the side edge of the light-shielding sheet 28 which slightly projects beyond the film cover 18, as shown in FIG. 15, and the second bending device 724 bends the light-shielding sheet 28 at the notch 29 along a side of the film cover 18 (see (v) in FIG. 18), as shown in FIG. 16.

The film cover 18 with the light-shielding sheets 26, 28 thus applied thereto is inserted into a casing 12 by the film cover inserting device 522, closing the exposure opening 16 in the casing 12. Specifically, the light-shielding sheet 26 mounted on the film cover 18 cooperates with the light-shielding sheet 22 mounted on the end face 19 of the casing 12 in closing the film discharge slot 20 from within the casing 12. The light-shielding sheet 28 mounted on the film cover 18 closes the groove 24 in the exposure opening 16.

The casing 12 with the film cover 18 inserted therein is inspected for a light-shielded state achieved by the light-shielding sheet 28 in the inspecting station C5, and thereafter fed to the film case assembling device 524. In the film case assembling device 524, the lid 14 fed by the first assembly line 502*a* is inverted and mounted on the casing 12 (see (w) in FIG. 18). As a result, a film case 10 shown in FIG. 1 is completed.

The inspecting station C6 inspects the film case 10 to ascertain how the lid 14 is mounted on the casing 12. If the inspected film case 10 is judged as a defective product, then it is discharged by the defective product removing device 526.

If the film case 10 is defect-free, then it is transferred by the transfer device 528 onto the feed line 908, which feeds the film case 10 to the film case stacking machine 900 (see (x) in FIG. 18).

The film case stacking machine 900 operates according to a process that is substantially a reversal to the process performed by the casing/lid supply machine 100, for storing the film case 10 in a container 102. Specifically, the film case 10 is temporarily stored in the buffer magazine 910 by the pushing mechanism 912, and then stored in the container 102 that has been fed by the container feed line 800 and is waiting in front of the buffer magazine 910. After the container 102 is moved by the displacement plate 916 moving along the guide rail 914, the container 102 is transferred onto the lifting and lowering mechanism 918 and turned about 90°. After the container 102 is lowered by the lifting and lowering mechanism 918, it is transferred onto the conveyor 920 and then discharged (see (y) in FIG. 18).

The film case manufacturing system according to the present invention allows highly accurately film cases to be automatically manufactured without manual intervention.

Since the casing/lid supply machine supplies casings and lids from a container via a buffer magazine, the rates at which casings and lids are supplied can be adjusted to efficiently manufacture film cases without shutting off the assembly line.

Inasmuch as the main assembly line for assembling film cases are linear, the overall system arrangement is simpler and needs easier maintenance than would be if a rotary index table were employed.

Because discharging air is applied sideways to stacked film covers or pressers, they are prevented from being delivered simultaneously together, but are reliably be separated and fed one by one.

Each of the manufacturing steps is associated with an imaging device to inspect products based on image information generated thereby. Accordingly, it is possible for the film case manufacturing system to manufacture defect-free products.

In the mechanism for mounting light-shielding sheets produced from a light-shielding sheet ribbon, the nip roller for supplying them is selectively switched into and out of nipping engagement with the light-shielding sheet ribbon. The light-shielding sheet ribbon is thus prevented from meandering in its travel.

Although a certain preferred embodiment of the present invention has been shown and described in detail, it should be understood that various changes and modifications may be made therein without departing from the scope of the appended claims.

What is claimed is:

1. A method of manufacturing a film case including a casing having an exposure opening and a film discharge slot, for storing a plurality of sheet-like films therein, a film cover detachably mounted in said exposure opening for holding the sheet-like films in a light-shielded fashion in said casing, a lid closing said casing with the sheet-like films stored therein, and a presser mounted on said lid for pressing the sheet-like films stored in said casing toward said exposure opening, comprising the steps of:

feeding said casing and said lid on a main assembly line;

supplying said film cover to said main assembly line and assembling the film cover in said casing;

supplying said presser to said main assembly line and assembling the presser on said lid; and mounting said lid to said casing.

* * * * *